(12) United States Patent
Hayasaki et al.

(10) Patent No.: US 12,158,655 B2
(45) Date of Patent: Dec. 3, 2024

(54) OPTICAL FILM AND EYEWEAR

(71) Applicant: NIPPON KAYAKU KABUSHIKI KAISHA, Tokyo (JP)

(72) Inventors: Tomoyuki Hayasaki, Tokyo (JP); Yoshiyuki Yahagi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 560 days.

(21) Appl. No.: 17/480,559

(22) Filed: Sep. 21, 2021

(65) Prior Publication Data

US 2022/0004028 A1 Jan. 6, 2022

Related U.S. Application Data

(63) Continuation of application No. PCT/JP2020/012836, filed on Mar. 24, 2020.

(30) Foreign Application Priority Data

Mar. 28, 2019 (JP) ................. 2019-063657

(51) Int. Cl.
*G02C 7/12* (2006.01)
*G02B 5/30* (2006.01)
*G02F 1/1335* (2006.01)

(52) U.S. Cl.
CPC ..... *G02F 1/133543* (2021.01); *G02B 5/3041* (2013.01); *G02C 7/12* (2013.01); *G02F 1/133541* (2021.01)

(58) Field of Classification Search
None
See application file for complete search history.

(56) References Cited

U.S. PATENT DOCUMENTS

| 4,683,327 A | 7/1987 | Stackman |
| 5,622,648 A | 4/1997 | Parri et al. |

(Continued)

FOREIGN PATENT DOCUMENTS

| CN | 106461848 A | 2/2017 |
| CN | 107111031 A | 8/2017 |

(Continued)

OTHER PUBLICATIONS

Notice of Reasons for Refusal dated Oct. 7, 2022 for corresponding Japanese Application No. 2020-544555 and English translation.

(Continued)

*Primary Examiner* — Darryl J Collins
(74) *Attorney, Agent, or Firm* — Pearne & Gordon LLP

(57) ABSTRACT

Disclosed is an optical film including an optical laminate having two or more laminated light reflection layers of different center wavelengths of reflection and a polarizing element layer. Reflection layers are selected from at least one light reflection layer of both RPRL and LPRL, each having a center wavelength of selective reflection at or within 400 nm and 900 nm, RPRL having a fixed cholesteric liquid crystal phase with a right-handed spiral structure having right-handed circularly polarized light reflectivity, and LPRL having a fixed cholesteric liquid crystal phase with a left-handed spiral structure having left-handed circularly polarized light reflectivity. Layers RPRL and LPRL have center wavelengths of selective reflection shifted from that of a light reflection layer adjacent to each other by an interval of 40 nm or more and 500 nm or less, and the maximum reflectance of optical laminate is 50% or less.

6 Claims, 11 Drawing Sheets

(56) References Cited

U.S. PATENT DOCUMENTS

| | | |
|---|---|---|
| 5,770,107 A | 6/1998 | Hassall et al. |
| 6,136,225 A | 10/2000 | Meyer et al. |
| 6,335,462 B1 | 1/2002 | Etzbach et al. |
| 6,395,351 B1 | 5/2002 | Benecke et al. |
| 2001/0035520 A1 | 11/2001 | Takeuchi et al. |
| 2005/0074564 A1 | 4/2005 | Yamaoka et al. |
| 2005/0122586 A1 | 6/2005 | Adachi et al. |
| 2012/0081653 A1 | 4/2012 | Oki |
| 2017/0160566 A1 | 6/2017 | Tanaka et al. |
| 2017/0285235 A1 | 10/2017 | Hayasaki et al. |
| 2018/0267219 A1 | 9/2018 | Abe et al. |
| 2019/0030856 A1 | 1/2019 | Hayasaki et al. |
| 2019/0033498 A1 | 1/2019 | Tanaka et al. |
| 2019/0033620 A1 | 1/2019 | Yahgai et al. |
| 2019/0049754 A1 | 2/2019 | Yahagi et al. |
| 2019/0324180 A1 | 10/2019 | Hayasaki et al. |
| 2020/0033638 A1 | 1/2020 | Yahagi et al. |

FOREIGN PATENT DOCUMENTS

| | | |
|---|---|---|
| CN | 109073808 A | 12/2018 |
| CN | 109073809 A | 12/2018 |
| JP | 01-272551 A | 10/1989 |
| JP | 06-016616 A | 1/1994 |
| JP | 07-110469 A | 4/1995 |
| JP | 11-080081 A | 3/1999 |
| JP | 11-125717 A | 5/1999 |
| JP | 2001-328973 A | 11/2001 |
| JP | 2002-179668 A | 6/2002 |
| JP | 2003-287623 A | 10/2003 |
| JP | 2012-078665 A | 4/2012 |
| JP | 2013-064798 A | 4/2013 |
| JP | 2017-198981 A | 11/2017 |
| TW | 201606395 A | 2/2016 |
| TW | 201743080 A | 12/2017 |
| TW | 201902705 A | 1/2019 |
| WO | 95/22586 A1 | 8/1995 |
| WO | 95/24455 A1 | 9/1995 |
| WO | 97/00600 A2 | 1/1997 |
| WO | 98/23580 A1 | 6/1998 |
| WO | 98/52905 A1 | 11/1998 |
| WO | 2016/002582 A1 | 1/2016 |
| WO | 2016/098732 A1 | 6/2016 |
| WO | 2017/086067 A1 | 5/2017 |
| WO | 2017/175581 A1 | 10/2017 |
| WO | 2017/175829 A1 | 10/2017 |
| WO | 2017/175830 A1 | 10/2017 |
| WO | 2018/186369 A1 | 10/2018 |

OTHER PUBLICATIONS

Notice of Reasons for Refusal dated Dec. 9, 2020 for corresponding Japanese Application No. 2020-544555 and English translation.
Decision to Grant a Patent dated Feb. 15, 2021 for corresponding Japanese Application No. 2020-544555 and English translation.
International Search Report for corresponding International Application No. PCT/JP2020/012836 mailed Jun. 9, 2020.
Written Opinion for corresponding International Application No. PCT/JP2020/012836 dated Jun. 9, 2020 and English translation.
International Preliminary Report on Patentability for corresponding International Application No. PCT/JP2020/012836 Sep. 28, 2021.
Y. Goto et al., "Liquid Crystalline Behavior in Octahedral Metal Complexes", Molecular Crystals and Liquid Crytals, vol. 260, pp. 23-28, 1995.
"In-situ photopolymerization of oriented liquid-crystalline acrylates, 3. Oriented polymer networks from a mesogenic diacrylate", Die Makromolekulare Chemie, vol. 190, pp. 2255, 1989.
"In situ photopolymerized, oriented liquid-crystalline diacrylates with high thermal conductivities", Advanced Materials, vol. 5, pp. 107, 1993.
Ekisho Debaisu Handobukku (Liquid Crystal Device Handbok), Chapter 3, Section 4-3 TN, STN yo Kairaruzai (Chiral Agents for TN and STN), p. 199, 142nd Committee of Japan Society for the Promotion of Science, 1989 and concise explanation.
Extended European Search Report dated Jun. 28, 2023 for corresponding European Application No. 20776446.5.
Office Action dated Sep. 23, 2023 for corresponding Taiwanese Application No. 109110252 and English translation.
First Office Action dated Feb. 11, 2023 for corresponding Chinese Application No. 202080024976.6 and English translation.

OPTICAL FILM AND EYEWEAR

CROSS REFERENCE TO RELATED APPLICATIONS

This is a continuation application of International Patent Application No. PCT/JP2020/012836 filed Mar. 24, 2020, which claims the benefit of Japanese Patent Application No. 2019-063657 filed Mar. 28, 2019, and the full contents of all of which are hereby incorporated by reference in their entirety.

BACKGROUND

Technical Field

The present disclosure relates to an optical film including a plurality of light reflection layers having cholesteric liquid crystal layers having center wavelengths of selective reflection different from each other, and exhibiting a high degree of polarization and a low haze value. Such an optical film is mainly applied to eyewear (sunglasses, goggles, helmet visors, etc.).

Description of the Related Art

Eyewear (sunglasses, goggles, visors, etc.) has been used to reduce glare caused by reflected light from a water surface, road surface, snow surface, etc. For example, in sunglasses, a lens portion is colored with a pigment, etc., which absorbs the reflected light. As a result, the amount of light incident on the eyes of the sunglasses wearer can be reduced, and the glare can be reduced. On the other hand, in general, the reflected light on the water surface and snow surface has a property of being polarized, and therefore polarized sunglasses are particularly effective for these reflected lights. Since the polarized sunglasses are designed to effectively absorb the light in its polarization direction, it is possible to reduce glare and improve visibility without significantly reducing the amount of light incident on the eyes.

The optical film used for polarized sunglasses usually has a structure in which a polarizing element is interposed between supporting materials such as polycarbonate. Polarized sunglasses can be produced by processing such an optical film into a desired shape and fitting it into a frame. The polarizing element is a film in which a so-called dichroic pigment such as a dichroic dye or a polyiodine-polyvinyl alcohol (PVA) complex is uniaxially oriented together with a polymer such as PVA, and polarizing elements of various colors can be obtained depending on the color of the pigment used. In the case of ordinary sunglasses, the polarizing element is often colored in a grayish color in order to impart polarizability to the entire visible light region.

A multilayer film may be deposited on the surface of polarized sunglasses in order to impart designability or further to improve visibility. By imparting a multilayer film, the reflected light on the surface of the sunglasses can be seen by others who are not wearing polarized sunglasses in metallic tones such as blue, green, and red, and due to the specific reflected light, the glare is reduced and the visibility of scenery through the lens is further improved for the wearer. While it is beneficial for the wearer to impart the multilayer film in this way, there arise problems on handleability such that sebum is difficult to be removed when adhering to the multilayer film, and the film may peel off in places exposed to moisture and sea breeze, such as sea.

In order to solve such problems, a method for arranging a multilayer film inside the support material, i.e., between the polarizing element and the support material can be employed. However, since the multilayer film exhibits the reflection performance due to the difference in the refractive index between the layers, it is difficult for the multilayer film to obtain the reflection performance equivalent to that of the air interface. Further, since the multilayer film is made of an inorganic substance, there is a problem of adhesion to a polarizing element that is an organic substance.

As a method for imparting reflected light having a metallic color tone with an organic substance without using a multilayer film, on the other hand, a method for using a cholesteric liquid crystal layer has been known. The cholesteric liquid crystal is in a state where the liquid crystal molecules are spirally oriented, and has a function of selectively reflecting a circularly polarized light component in the same direction as the spiral direction of the liquid crystal molecules in a specific wavelength region depending on the length of the spiral pitch. An optical laminate by using a cholesteric liquid crystal layer in which spiral orientation is fixed so that light is reflected in a desired wavelength region, exhibits reflected light of a vivid color tone and can impart decorativeness to various members.

A cholesteric liquid crystal has a nature of being capable of selectively reflecting circularly polarized light components in a specific wavelength region. Further, there are right-handed and left-handed spiral orientations, and in the case of right-handed spiral orientation, only the right-handed circularly polarized light component is reflected, and in the case of left-handed spiral orientation, only the left-handed circularly polarized light component is reflected. Therefore, in the case of right-handed spiral orientation, when external light is incident, only the right-handed circularly polarized light component in the wavelength region corresponding to the spiral pitch is reflected, and the left-handed circularly polarized light component in the corresponding wavelength region is transmitted.

As described above, when the cholesteric liquid crystal layer is used, it is possible to impart reflected light having a metallic color tone without using a multilayer film, on the other hand, the transmitted light in the wavelength region of the reflected light is, in principle, a circularly polarized light. Since the polarizing element manufactured by using a dichroic pigment functions for linearly polarized light, when combing the polarizing element with a cholesteric liquid crystal layer, the polarizing element cannot sufficiently absorb the transmitted light. Therefore, there arises a concern about a new problem that the light leaking from the polarizing element increases and the original function as polarized sunglasses is deteriorated.

In response to this problem, International Publication No. WO2016/002582 discloses an optical film including a light reflection layer R having a cholesteric liquid crystal layer having a right-handed spiral orientation, a light reflection layer L having a cholesteric liquid crystal layer having a left-handed spiral orientation, and a polarizing element layer, reflects both the left-handed circularly polarized light component and the right-handed circularly polarized light component on each light reflection layer. In International Publication No. WO2016/002582, when setting the interval between the center wavelength of selective reflection of light reflection layer R and that of light reflection layer L to be within 20 nm, a high degree of polarization is obtained by reflecting circularly polarized light having substantially the same center wavelengths of selective reflection on each light reflection layer. However, an optical film having a wider interval between the center wavelength of selective reflection of light reflection layer R and that of light reflection layer L does not achieve a degree of polarization of 90 or more. Moreover, since each center wavelength of selective reflection of light reflection layer R and light reflection layer L is the same or substantially the same, it is highly possible for the maximum reflectance of the optical film to exceed 50%. Furthermore, when applying the optical film to eyewear, not only a high degree of polarization but also a low haze value is required.

SUMMARY

The present disclosure is related to providing an optical film including a plurality of light reflection layers having center wavelengths of selective reflection different from each other, and exhibiting a high degree of polarization and a low haze value, and eyewear.

According to an aspect of the present disclosure, an optical film includes an optical laminate in which two or more light reflection layers having center wavelengths of reflection different from each other are laminated, and a polarizing element layer, wherein the two or more light reflection layers are selected from at least one light reflection layer RPRL having a center wavelength of selective reflection in a range of 400 nm or more and 900 nm or less, in which a cholesteric liquid crystal phase with a right-handed spiral structure having a right-handed circularly polarized light reflectivity is fixed, and at least one light reflection layer LPRL having a center wavelength of selective reflection in a range of 400 nm or more and 900 nm or less, in which a cholesteric liquid crystal phase with a left-handed spiral structure having a left-handed circularly polarized light reflectivity is fixed, the light reflection layer RPRL and the light reflection layer LPRL each have a center wavelength of selective reflection shifted from that of a light reflection layer adjacent to each other by an interval of 40 nm or more and 500 nm or less, and the maximum reflectance of the optical laminate is 50% or less.

In one embodiment of the present disclosure, the two or more light reflection layers include both of the light reflection layer RPRL and the light reflection layer LPRL.

In one embodiment of the present disclosure, a degree of polarization is 90% or more.

In one embodiment of the present disclosure, a degree of polarization is 95% or more.

In one embodiment of the present disclosure, a haze value (Hz) is less than 0.5%.

In one embodiment of the present disclosure, a difference between a maximum reflectance and an average reflectance of the optical laminate is 30% or less and a difference between an average reflectance and a minimum reflectance of the optical laminate is 15% in a wavelength region of 450 nm or more and 750 nm or less.

According to another aspect of the present disclosure, an eyewear including the optical film according to the present disclosure.

According to the present disclosure, it is possible to provide an optical film including a plurality of light reflection layers having center wavelengths of selective reflection different from each other and having a high degree of polarization and a low haze value, and eyewear including the optical film.

DETAILED DESCRIPTION

Hereinafter, a representative optical film according to the present disclosure will be described with reference to the drawings. The embodiments shown below merely exemplify typical embodiments used to specifically describe the present disclosure, and various embodiments can be contemplated within the scope of the present disclosure.

PRL in the present disclosure is an abbreviation of Polarized light Reflection Layer and refers to a light reflection layer. A light reflection layer RPRL represents a light reflection layer having a cholesteric liquid crystal layer having a right-handed spiral structure, and a light reflection layer LPRL represents a light reflection layer having a cholesteric liquid crystal layer having a left-handed spiral structure.

Moreover, a center wavelength of selective reflection may be simply expressed as the center reflection wavelength. Further, the numerical range represented by using "to" refers to a range including the numerical values before and after "to" as the lower limit values and the upper limit values.

<Optical Laminate>

Figure 1:
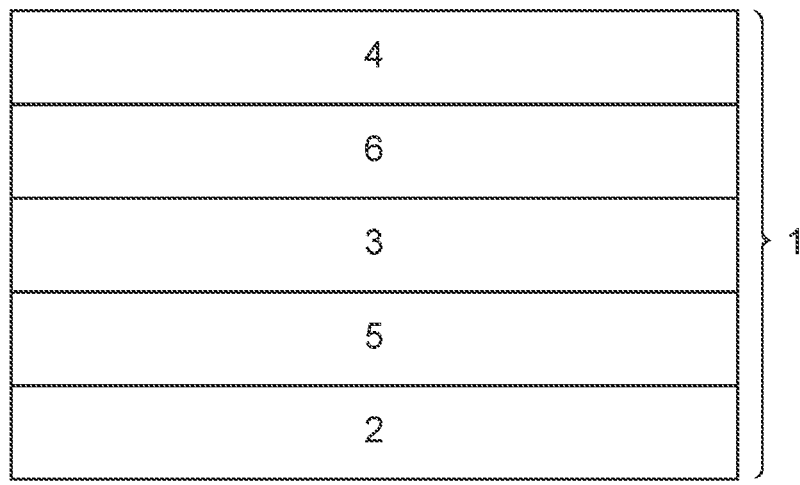
FIG. 1 is a schematic view of an embodiment of an optical laminate included in the optical film according to the present disclosure.

FIG. 1 shows an example of an optical laminate in which a plurality of light reflection layers are laminated. An optical laminate 1 includes light reflection layers 2, 3 and 4 in which cholesteric liquid crystal phases are fixed, and adhesive layers 5 and 6 formed between these light reflection layers 2, 3 and 4. Adhesive layers 5 and 6 are formed by using, for example, an adhesive. Incidentally, when light reflection layers 2, 3 and 4 can be laminated without using an adhesive, light reflection layers 2, 3 and 4 can be directly laminated without interposing adhesive layers 5 and 6.

In one embodiment, since each light reflection layer has a different center wavelength of reflection, the cholesteric liquid crystal layer is used for light reflection layer 3, which has a center wavelength of reflection on the longer wavelength side and has the opposite direction of spiral rotation as compared with the cholesteric liquid crystal layer of light reflection layer 2. Similarly, for light reflection layer 4, the cholesteric liquid crystal layer having a center wavelength of reflection on the longer wavelength side and having the opposite direction of spiral rotation as compared with the cholesteric liquid crystal layer of light reflection layer 3, is used. For example, when the cholesteric liquid crystal layer (RCLC-2) having a right-handed spiral structure is used for light reflection layer 2, cholesteric liquid crystal layer (LCLC-3) having a center wavelength of reflection on the longer wavelength side and having a left-handed spiral structure as compared with the cholesteric liquid crystal layer (RCLC-2), is used for light reflection layer 3, and the cholesteric liquid crystal layer (RCLC-4) having a center wavelength of reflection on the longer wavelength side and having a right-handed spiral structure as compared with the cholesteric liquid crystal layer (LCLC-3), is used for light reflection layer 4. Therefore, optical laminate 1 illustrated in FIG. 1, using such light reflection layers 2, 3 and 4, has the laminated structure of RPRL-2/adhesive layer 5/LPRL-3/adhesive layer 6/RPRL-4. Further, regarding the laminated structure, when light reflection layers having spiral rotation directions opposite to each other are used instead of each corresponding light reflection layer, optical laminate 1 may have the laminated structure of LPRL-2/adhesive layer 5/RPRL-3/adhesive layer 6/LPRL-4. Incidentally, RCLC (LCLC) is an abbreviation for Right (Left) Cholesteric Liquid Crystal, and refers to a cholesteric liquid crystal layer having a right-handed spiral structure or a left-handed spiral structure. Moreover, the numbers following RCLC (LCLC) or RPRL (LPRL) refer to the numbers assigned as light reflection layers 2, 3 and 4 in FIG. 1. The same applies hereinafter.

As one of other embodiments, the cholesteric liquid crystal layer having a center wavelength of reflection on the shorter wavelength side and having a opposite spiral rotation direction as compared with the cholesteric liquid crystal layer of light reflection layer 2, may be used for light reflection layer 3, on the other hand, the cholesteric liquid crystal layer having a center wavelength of reflection on the longer wavelength side and having the same spiral rotation direction as compared with the cholesteric liquid crystal layer used for light reflection layer 2, may be used for light reflection layer 4. In this case, for example, when the cholesteric liquid crystal layer (RCLC-2) having a right-handed spiral structure is used as light reflection layer 2, the cholesteric liquid crystal layer (LCLC-3) having a center wavelength of reflection on the shorter wavelength side and having a left-handed spiral structure as compared with the cholesteric liquid crystal layer (RCLC-2), is used for light reflection layer 3, and the cholesteric liquid crystal layer (RCLC-4) having a center wavelength of reflection on the longer wavelength side and having a right-handed spiral structure as compared with the cholesteric liquid crystal layer (RCLC-2), is used for light reflection layer 4. Moreover, regarding this laminated structure, even if a laminate structure using light reflection layers having the opposite spiral rotation directions are used instead of each corresponding light reflection layer, an optical laminate exhibiting the same effect as the light reflection characteristics, can be obtained.

As one of other embodiments, the cholesteric liquid crystal layer having a center wavelength of reflection on the longer wavelength side and having an opposite spiral rotation direction as compared with the cholesteric liquid crystal layer used for light reflection layer 2 may be used for light reflection layer 3, on the other hand, the cholesteric liquid crystal layer having a center wavelength of reflection on the shorter wavelength side and having the same spiral rotation direction as compared with the cholesteric liquid crystal layer used for light reflection layer 2, may be used for light reflection layer 4. In this case, for example, when the cholesteric liquid crystal layer (RCLC-2) having a right-handed spiral structure is used as light reflection layer 2, the cholesteric liquid crystal layer (LCLC-3) having a center wavelength of reflection on the longer wavelength side and having a left-handed spiral structure as compared with the cholesteric liquid crystal layer (RCLC-2), is used for light reflection layer 3, and the cholesteric liquid crystal layer (RCLC-4) having a center wavelength of reflection on the shorter wavelength side and having a right-handed spiral structure as compared with the cholesteric liquid crystal layer (RCLC-2), is used for light reflection layer 4. Moreover, regarding this laminated structure, even if a laminate structure in which light reflection layers having the opposite spiral rotation directions, are used instead of each corresponding light reflection layer, an optical laminate exhibiting the same effect as the light reflection characteristics, can be obtained.

As another embodiment, the cholesteric liquid crystal layer having a center wavelength of reflection on the longer wavelength side and having the same spiral rotation direction as compared with the cholesteric liquid crystal layer used for light reflection layer 2, may be used for light reflection layer 3, and further, the cholesteric liquid crystal layer having a center wavelength of reflection on the shorter wavelength side and having the same spiral rotation direction as compared with the cholesteric liquid crystal layer used for light reflection layer 2, may be used for light reflection layer 4. In this case, for example, when the cholesteric liquid crystal layer (RCLC-2) having a right-handed spiral structure is used as light reflection layer 2, the cholesteric liquid crystal layer (RCLC-3) having a center wavelength of reflection on the longer wavelength side than that of cholesteric liquid crystal layer (RCLC-2) and having a right-handed spiral structure, is used for light reflection layer 3, and the cholesteric liquid crystal layer (RCLC-4) having a center wavelength of reflection on the shorter wavelength side than that of cholesteric liquid crystal layer (RCLC-2) and having a right-handed spiral structure, is used for light reflection layer 4. Moreover, regarding this laminated structure, instead of laminating each corresponding light reflection layer, even if a laminate structure in which each light reflection layer having the opposite spiral rotation direction is laminated or a laminate structure in which each light reflection layer having a certain center wavelength of reflection is laminated at random in terms of order of the wavelength, is used, an optical laminate exhibiting the same effect as the light reflection characteristics, can be obtained.

Namely, the lamination order of light reflection layers 2, 3 and 4 of the optical laminate is not limited to the laminated structure in which light reflection layers are laminated in order of the spiral rotation direction specified, or a laminated structure in which light reflection layers are laminated in order from the longer or shorter center wavelength of reflection, and any laminated structure can be designed without limitation.

In the optical laminate according to the present embodiment, the order of lamination of the light reflection layers is not particularly limited provided that either one or both of at least one light reflection layer RPRL and at least one light reflection layer LPRL are laminated in a total of two or more layers. For example, in FIG. 1, each of light reflection layers 2, 3 and 4 may be either light reflection layer RPRL or light reflection layer LPRL, and both light reflection layer RPRL and light reflection layer LPRL may be included. Moreover, the optical laminate shown in FIG. 1 is an optical laminate having a three-layer structure, but may be an optical laminate having a two-layer structure, or may include four or more light reflection layers. In particular, when each of light reflection layers 2, 3 and 4 includes both light reflection layer RPRL and light reflection layer LPRL, an optical film exhibiting a higher degree of polarization can be obtained.

From the viewpoint of application to eyewear that imparts designability, light reflection layer RPRL and light reflection layer LPRL each have a center wavelength of selective reflection in the range of 400 nm or more and 900 nm or less. The lower limit of the center wavelength of selective reflection is preferably 420 nm or more and more preferably 450 nm or more. Further, the upper limit of the center wavelength of selective reflection is preferably 850 nm or less and more preferably 750 nm or less.

Light reflection layer RPRL and light reflection layer LPRL each have a center wavelength of selective reflection shifted from that of a light reflection layer adjacent to each other by an interval of 40 nm or more and 500 nm or less. This interval of less than 40 nm is too narrow, and therefore is equivalent to that for an optical film having a single center wavelength of selective reflection and exhibiting a metallic color tone, which tends not to allow a low haze value to be imparted to the optical film, and is not preferred in the present disclosure. If the interval is wider than 500 nm, on the other hand, it becomes difficult for the optical film to reflect light in the visible light region, and there is a risk of not being applied to applications as eyewear that imparts designability. The more preferred upper limit of the shifted interval of the center wavelengths of selective reflection is 480 nm or less, more preferably 450 nm or less, particularly preferably 400 nm or less, and most preferably 350 nm or less. Further, the lower limit is more preferably 70 nm or more, still more preferably 100 nm or more, and particularly preferably 150 nm or more. Therefore, the most preferred range for the shifted interval of the center wavelengths of selective reflection is 150 nm or more and 350 nm or less.

From the viewpoint of applying the optical film having the optical laminate in which light reflection layer RPRL and light reflection layer LPRL are laminated in total of two or more layers thereof, to eyewear that requires a high degree of polarization, the optical laminate has the maximum reflectance is 50% or less, more preferably 40% or less, and still more preferably 30% or less, with respect to the incident light of the optical laminate. When the maximum reflectance is 50% or less, a high degree of polarization can be obtained. Incidentally, the incident light is light that is vertically incident on the optical laminate. Further, the maximum reflectance refers to the maximum reflectance of the optical laminate in the wavelength region of 400 nm or more and 900 nm or less, and the minimum reflectance refers to the minimum reflectance of the optical laminate in the wavelength region of 400 nm or more and 900 nm or less.

Light reflection layer RPRL and light reflection layer LPRL have center wavelengths of selective reflection different from each other. As a result, an optical film having a maximum reflectance of 50% or less is facilitated to be obtained and an optical film exhibiting a metallic color tone as reflected light, can be obtained.

In the present embodiment, when an optical film exhibiting tinted reflected light or reflected light having a colorless tone or metallic silver tone is produced, the difference between the maximum reflectance and the average reflectance of the optical laminate is preferably 30% or less in the wavelength region of 450 nm or more and 750 nm or less, and the difference between the average reflectance and the minimum reflectance of the optical laminate is preferably 15% or less. When producing an optical film exhibiting tinted reflected light, the lower limit of the difference between the maximum reflectance and the average reflectance is preferably greater than 5%, and the lower limit of the difference between the average reflectance and the minimum reflectance is preferably greater than 4%. In the wavelength region of 450 nm or more and 750 nm or less, when the difference between the maximum reflectance and the average reflectance of the optical laminate is greater than 5% and 30% or less, and the difference between the average reflectance and the minimum reflectance of the optical laminate is greater than 4% and less than 30%, the reflected light is developed when the optical film faces the front direction or when tilted, and the reflected light having a tint can be obtained. When producing an optical film exhibiting reflected light having a colorless tone or a metallic silver tone, on the other hand, the difference between the maximum reflectance and the average reflectance of the optical laminate is 5% or less, and the difference between the average reflectance and the minimum reflectance of the optical laminate is preferably 5% or less, in the wavelength region of 450 nm or more and 750 nm or less. Thereby, it is enables to produce an optical film that exhibits reflected light having a colorless tone or metallic silver tone.

The thickness of each light reflection layer is preferably 0.2 µm or more and 2 µm or less, more preferably 0.3 µm or more and 1.5 µm or less, and still more preferably 0.4 µm or more and 1.4 µm or less, and particularly preferably 0.5 µm or more and 1.2 µm. If the thickness of each light reflection layer is less than 0.2 µm, the reflectance of the obtained optical laminate may be extremely low, while if the thickness of the light reflection layer exceeds 2 µm, the degree of polarization may be decreased. In addition, the thickness of the optical laminate is preferably 1 µm or more and 100 µm or less and more preferably 5 µm or more and 30 µm or less.

The haze value of the optical laminate is preferably less than 0.5% and more preferably 0.3% or less. When the haze value is 0.5% or more, the opacity of the optical laminate is large, which is not suitable for use in eyewear, the transparency of which is important.

Each light reflection layer of light reflection layer RPRL and light reflection layer LPRL can be formed by various methods. An example thereof includes a method of forming by coating with a liquid crystal coating liquid described below. More specifically, a surface of a substrate, oriented layer, etc., is coated with a curable liquid crystal composition that enables to form a cholesteric liquid crystal layer to obtain a cholesteric liquid crystal phase of the composition, and then, the cholesteric liquid crystal phase is fixed by proceeding with the curing reaction (for example, polymerization reaction, cross-linking reaction, etc.) to form a prescribed light reflection layer.

Each light reflection layer of light reflection layer RPRL and light reflection layer LPRL formed by fixing the cholesteric liquid crystal phase, tends to be deteriorated by ultraviolet light irradiation, and the deterioration with respect to ultraviolet light having a wavelength of 380 nm or less is particularly remarkable. Therefore, for example, by adding a material (ultraviolet absorber) that absorbs light in the ultraviolet region to a substrate or at least one light reflection layer, or by laminating separately a layer including the material, for example, a light absorbing layer, with the optical laminate, the deterioration of the light reflection layer can be remarkably inhibited.

The optical laminate can be formed by various methods. One example is a method of forming by adhering a light reflection layer with a substrate, which will be described below. More specifically, the optical laminate can be formed by coating a surface of the substrate or the light reflection layer with an adhesive or a pressure-sensitive adhesive, adhering another light reflection layer on the surface, and proceeding with a curing reaction (for example, polymerization reaction, cross-linking reaction, etc.) to cure the layers, and repeating this step a plurality of times.

<Polarizing Element Layer>

Figure 2:
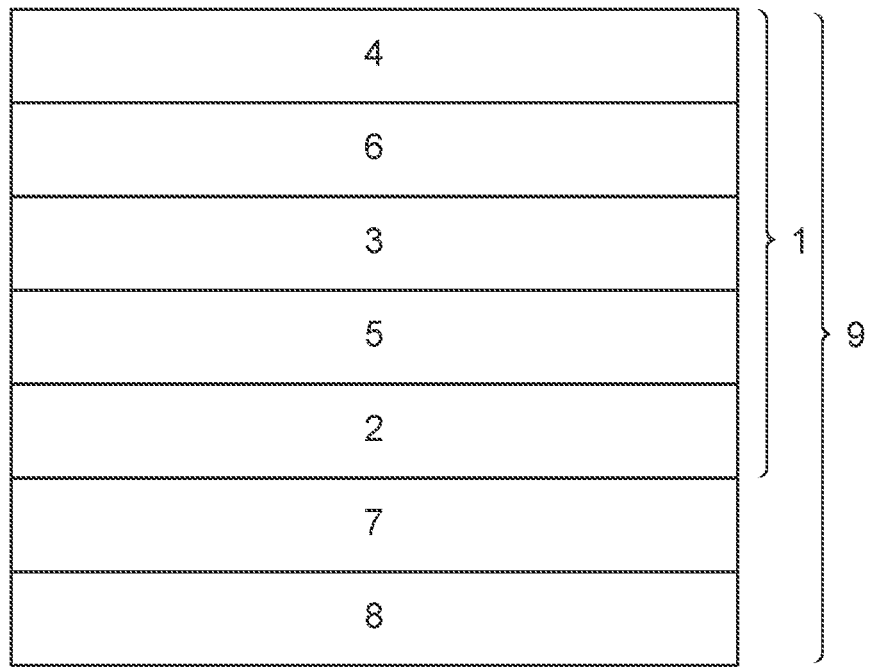
FIG. 2 is a schematic view of an embodiment of the optical film according to the present disclosure.

FIG. 2 shows an example of the optical film according to the present embodiment. In optical film 9 shown in FIG. 2, optical laminate 1 shown in FIG. 1 is arranged on polarizing element layer 8 formed of the polarizing element via adhesive layer 7. The material of polarizing element layer 8 typically includes a PVA polarizing film. The method for producing the polarizing element layer is not particularly limited, and for example, polarizing element layer 8 is produced by adsorbing a pigment such as iodine or a dichroic dye in a polymer film formed of a polyvinyl alcohol or a derivative thereof, and then stretching and orienting the film in a uniaxial manner. As the pigment, the dichroic dye is preferable from the viewpoint of heat resistance, and a direct dye of an azo dye having a sulfonic acid group is particularly preferred. Further, the method for laminating the optical laminate and the polarizing element layer is not particularly limited, but they are desirably adhered via an adhesive layer because the high adhesive strength can be obtained. As the adhesive layer, both a hot melt-type adhesive and a curable-type adhesive can be used. Usually, the curable-type adhesives, such as an acrylic resin-based material, urethane resin-based material, polyester resin-based material, melamine resin-based material, epoxy resin-based material, silicone-based material, can be used, and in particular a thermosetting urethane resin of two-component type, containing a polyurethane prepolymer that is a urethane resin-based material and a curing agent, is preferred because of its excellent adhesion upon binding processing and processability. For the adhesive that adheres the optical laminate with the polarizing element layer, an adhesive in which a photochromic dye is dissolved may be used.

The embodiments of optical laminate 1 and optical film 9 are not limited to the embodiments illustrated in FIGS. 1 and 2. Two or more predetermined light reflection layers may be laminated on optical laminate 1, and three or more layers may be laminated. Moreover, the order of forming each light reflection layer 2, 3, 4 • • • is not limited to the following order although in FIGS. 1 and 2, light reflection layer 2, light reflection layer 3, and light reflection layers 4, • • • are laminated in this order.

Next, examples of the method for producing various materials used for producing optical laminates and optical films, and the materials will be described in detail.

1. Material for Forming Light Reflection Layer

In light reflection layer RPRL and light reflection layer LPRL, a curable liquid crystal composition is preferably used for forming each light reflection layer. For example, the liquid crystal composition contains at least each component of a rod-shaped liquid crystal compound, an optically active compound (chiral compound), and a polymerization initiator, and each component may contain two or more types. For example, a polymerizable liquid crystal compound and a non-polymerizable liquid crystal compound can be combined for use. Moreover, a low molecular weight liquid crystal compound and a high molecular weight liquid crystal compound can also be used in combination. Further, in order to improve the uniformity of the orientation of various liquid crystal compounds, the coatability of the liquid crystal composition, and the strength of the obtained coating film, at least one type selected from various argents of horizontal alignment agents, unevenness inhibitors, repellent inhibitors, polymerizable monomers, etc., may be contained. Moreover, a polymerization inhibitor, an antioxidant, an ultraviolet absorber, a light stabilizer, a coloring material, metal oxide fine particles, etc., can be added to the liquid crystal composition, if necessary, within a range that does not deteriorate the optical performance.

(1) Rod-Shaped Liquid Crystal Compound

Examples of the rod-shaped liquid crystal compound include a rod-shaped nematic liquid crystal compound. Examples of the rod-shaped nematic liquid crystal compounds include azomethines, azoxy compounds, cyanobiphenyls, cyanophenyl esters, benzoic acid esters, cyclohexanecarboxylic acid phenyl esters, cyanophenylcyclohexanes, cyano-substituted phenylpyrimidines, phenyldioxans, trans and alkenylcyclohexylbenzonitriles are preferably used. Moreover, as the rod-shaped liquid crystal, not only a low molecular weight liquid crystal compound but also a high molecular weight liquid crystal compound can be used.

The rod-shaped liquid crystal compound may be polymerizable or non-polymerizable. The rod-shaped liquid crystal compounds having no polymerizable groups are described in various literatures (for example, Y. Goto et. al., Mol. Cryst. Liq. Cryst. 1995, Vol. 260, pp. 23-28). The polymerizable rod-shaped liquid crystal compound can be obtained by introducing a polymerizable group into the rod-shaped liquid crystal compound. Examples of the polymerizable group include an unsaturated polymerizable group, an epoxy group, and an aziridinyl group, and an unsaturated polymerizable group is preferred, and an ethylenically unsaturated polymerizable group is particularly preferred. The polymerizable group can be introduced into the molecule of the rod-shaped liquid crystal compound by various methods. The number of polymerizable groups contained in the polymerizable rod-shaped liquid crystal compound is preferably 1 to 6 and more preferably 1 to 3. The polymerizable rod-shaped liquid crystal compound includes the compounds described in Makromol. Chem., 190, 2255 (1989), Advanced Materials 5, 107 (1993), U.S. Pat. Nos. 4,683, 327, 5,622,648, 5,770,107, International Publication No. WO95/22586, International Publication No. WO95/24455, International Publication No. WO97/00600, International Publication No. WO98/23580, International Publication No. WO98/52905, Japanese Patent Laid-Open No. h01-272551, Japanese Patent Laid-Open No. h06-16616, Japanese Patent Laid-Open No. h07-110469, Japanese Patent Laid-Open No. h11-80081, Japanese Patent Laid-Open No. 2001-328973, etc. Two or more types of polymerizable rod-shaped liquid crystal compounds may be combined for use as rod-shaped liquid crystal compounds. When two or more kinds of polymerizable rod-shaped liquid crystal compounds are used in combination, the orientation temperature can be lowered.

(2) Optically Active Compound (Chiral Agent)

The liquid crystal composition exhibits a cholesteric liquid crystal phase, for that reason, it preferably contains an optically active compound. However, when the rod-shaped liquid crystal compound is a molecule having an asymmetric carbon atom, it may be possible to stably form a cholesteric liquid crystal phase without adding an optically active compound. The optically active compound can be selected from various publicly known chiral agents (for example, they are described in Liquid Crystal Device Handbook, Chapter 3, Section 4-3, Chiral Agent for TN and STN, page 199, Japan Society for the Promotion of Science 142 Committee, 1989). The optically active compound generally contains an asymmetric carbon atom, but an axially asymmetric compound or a planar asymmetric compound that does not contain an asymmetric carbon atom, can also be used as a chiral agent. Examples of axially asymmetric compounds or planar asymmetric compounds include binaphthyl, helicene, paracyclophane and derivatives thereof. The optically active compound (chiral agent) may have a polymerizable group. When the optically active compound has a polymerizable group and the rod-shaped liquid crystal compound used in combination also has a polymerizable group, a polymer having a repeating unit derived from the rod-shaped liquid crystal compound and a repeating unit derived from the optically active compound can be formed by the polymerization reaction between the polymerizable optically active compound and the polymerizable rod-shaped liquid crystal compound. In this aspect, the polymerizable group of the polymerizable optically active compound is preferably a group of the same type as the polymerizable group of the polymerizable rod-shaped liquid crystal compound. Therefore, the polymerizable group of the optically active compound is also preferably an unsaturated polymerizable group, an epoxy group or an aziridinyl group, more preferably an unsaturated polymerizable group, and particularly preferably an ethylenically unsaturated polymerizable group. Further, the optically active compound may be a liquid crystal compound.

The optically active compound in the liquid crystal composition is preferably 0.1 parts by weight or more and 20 parts by weight or less, and more preferably 1 part by weight or more and 10 parts by weight or less with respect to 100 parts by weight of the liquid crystal compound combined for use. The smaller the amount of the optically active compound used, the more preferably it does not affect the liquid crystallinity. Therefore, the optically active compound used as the chiral agent is preferably a compound that exhibits a strong twisting force so that a desired twisting orientation of a spiral pitch can be achieved even in a small amount. A chiral compound exhibiting such a strong twisting force includes, for example, the chiral agent described in Japanese Patent Laid-Open No. 2003-287623, and the chiral agent can be preferably used.

(3) Polymerization Initiator

The liquid crystal composition used for forming each light reflection layer is preferably a polymerizable liquid crystal composition, and preferably contains a polymerization initiator accordingly. Since the coated liquid crystal composition undergoes a curing reaction by irradiation with ultraviolet rays, the polymerization initiator used is preferably a photopolymerization initiator that enables to initiate the polymerization reaction by irradiation with ultraviolet rays. The photopolymerization initiator is not particularly limited, and includes for example, acetophenone compounds such as 2-methyl-1-[4-(methylthio)phenyl]-2-morpholinopropane-1-one ("Irgacure 907" manufactured by BASF SE), 1-hydroxycyclohexyl phenyl ketone ("Irgacure 184" manufactured by BASF SE), 4-(2-hydroxyethoxy)-phenyl (2-hydroxy-2-propyl) ketone ("Irgacure 2959" manufactured by BASF SE), 1-(4-dodecylphenyl)-2-hydroxy-2-methylpropan-1-one ("Darocur 953" manufactured by Merck & Co. Inc.), 1-(4-isopropylphenyl)-2-hydroxy-2-methylpropan-1-one ("Darocur 1116" manufactured by Merck & Co. Inc.), 2-hydroxy-2-methyl-1-phenylpropan-1-one ("Irgacure 1173" manufactured by BASF SE), diethoxyacetophenone; benzoin compounds such as benzoin, benzoin methyl ether, benzoin ethyl ether, benzoin isopropyl ether, benzoin isobutyl ether, 2,2-dimethoxy-2-phenylacetophenone ("Irgacure 651" manufactured by BASF SE); benzophenone compounds such as benzoyl benzoic acid, methyl benzoyl benzoate, 4-phenylbenzophenone, hydroxybenzophenone, 4-benzoyl-4'-methyldiphenylsulfide, 3,3'-dimethyl-4-methoxybenzophenone ("Kayacure MBP" manufactured by Nippon Kayakusha Co., Ltd.); and thioxanthone compounds such as thioxanthone, 2-chloro thioxanthone ("Kayacure CTX" manufactured by Nippon Kayakusha Co., Ltd.), 2-methylthioxanthone, 2,4-dimethylthioxanthone ("Kayacure RTX" manufactured by Nihon Kayakusha Co., Ltd.), isopropylthioxanthone, 2,4-dicloro thioxanthone ("Kayacure CTX" manufactured by Nippon Kayakusha Co., Ltd.), 2,4-diethylthioxanthone ("Kayacure DETX" manufactured by Nippon Kayakusha Co., Ltd.), 2,4-diisopropyl-thioxanthone ("Kayacure-DITX" manufactured by Nippon Kayakusha Co., Ltd.). These photopolymerization initiators may be used singly or in combinations of two or more.

The content of the photopolymerization initiator in the polymerizable liquid crystal composition is not particularly limited, but is preferably 0.5 parts by weight or more and 10 parts by weight or less, more preferably 2 parts by weight or more and 8 parts by weight or less with respect to 100 parts by weight of the polymerizable liquid crystal compound.

When the benzophenone compound or the thioxanthone compound is used as the photopolymerization initiator, a reaction auxiliary is preferably combined for use in order to promote the photopolymerization reaction. The reaction auxiliary is not particularly limited, and includes for example, amine compounds, such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, ethyl 4-dimethylaminobenzoate(n-butoxy), and isoamyl 4-dimethylaminobenzoate.

The content of the reaction auxiliary in the polymerizable liquid crystal composition is not particularly limited, but it is preferably used within a range that does not affect the liquid crystallinity of the polymerizable liquid crystal composition, and it is preferably 0.5 parts by weight or more and 10 parts by weight or less with respect to 100 parts by weight of the total of the polymerizable liquid crystal compound and the polymerizable compound of ultraviolet curable polymerization type. Moreover, the content of the reaction auxiliary is preferably 0.5 to 2 times the content of the photopolymerization initiator.

(4) Solvent

The liquid crystal composition further contains a solvent. Such a solvent is not particularly limited provided that it can dissolve the liquid crystal compound, chiral agent, etc., to be used, and examples thereof include methyl ethyl ketone, toluene, methyl isobutyl ketone, cyclopentanone, acetone, and anisole, with cyclopentanone having a favorable solubility being preferred. Further, these solvents can be added at an arbitrary ratio, and one type may be added alone, or a plurality of solvents may be used in combination. These solvents are dried and removed in a drying zone such as an oven or a film coater line.

(5) Additives

It is possible to further add additives, such as a leveling agent, defoaming agent, ultraviolet absorber, light stabilizer, antioxidant, polymerization inhibitor, cross-linking agent, plasticizer, inorganic fine particles, fillers, etc., to the liquid crystal composition at arbitrary proportions, if necessary, which also enables to impart the function of each additive to the liquid crystal composition. The leveling agent includes a fluorine-based compound, silicone-based compound, acrylic-based compound, etc. The ultraviolet absorber includes a benzotriazole-based compound, benzophenone-based compound, triazine-based compound, the photostabilizer includes a hindered amine-based compound, benzoate-based compound, etc., and the antioxidant includes a phenol-based compound, etc. The polymerization inhibitor includes methoquinone, methylhydroquinone, hydroquinone, etc., and the cross-linking agent includes polyisocyanates, melamine compounds, etc. The plasticizer includes phthalate esters, such as dimethyl phthalate and diethyl phthalate, trimellitic acid esters such as tris(2-ethylhexyl) trimellitate, aliphatic dibasic acid esters such as dimethyl adipate and dibutyl adipate, orthophosphate esters such as tributyl phosphate and triphenyl phosphate, and acetate esters such as glycerol triacetate and 2-ethylhexyl acetate.

2. Adhesive Layer Forming Material (Adhesive)

In the optical laminate according to the present embodiment, each light reflection layer, the optical laminate and the polarizing element layer can be laminated with an adhesive layer interposed therebetween, if necessary. Considering the application of the optical film to the optical member, the material for forming such an adhesive layer is preferably transparent. Examples of transparent resins that can be used as materials for forming the adhesive layer include acrylic resins and epoxy resins.

(1) Acrylic-Based Resin

The acrylic resin contains an acrylic monomer or oligomer as a main component and is cured by anionic polymerization, radical polymerization, or redox polymerization. Such an acrylic resin includes, for example, an anionic polymerization type instant adhesive containing 2-cyanoacrylate as a main component, a redox polymerization type acrylic adhesive containing a methacrylic acid ester as a main component, and an ultraviolet curable adhesive of radical polymerization type by irradiation with ultraviolet rays, containing a polyfunctional acrylic acid ester or a polyfunctional methacrylic acid ester as a main component. The UV curable adhesive contains a (meth)acrylate-based monomer, photopolymerization initiator and additive.

Examples of acrylic resins to be used include trimethylolpropane tri(meth)acrylate, pentaerythritol tri(meth)acrylate, pentaerythritol tetra(meth)acrylate, ditrimethylolpropane tetra(meth)acrylate, dipentaerythritol pentaacrylate, dipentaerythritol hexaacrylate, a reaction product of pentaerythritol tri(meth)acrylate with 1,6-hexamethylene diisocyanate, reaction product of pentaerythritol tri(meth)acrylate with isophorone diisocyanate, tris(acryloxyethyl) isocyanurate, tris(methacryloxyethyl) isocyanurate, reaction product of glycerol triglycidyl ether with (meth)acrylic acid, caprolactone-modified tris(acryloxyethyl) isocyanurate, reaction product of trimethylolpropane triglycidyl ether and (meth)acrylic acid, triglycerol di(meth)acrylate, reaction product of propylene glycol diglycidyl ether and (meth)acrylic acid, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth)acrylate, reaction product of 1,6-hexanediol diglycidyl ether with (meth)acrylic acid, 1,6-hexanediol di(meth)acrylate, glycerol di(meth)acrylate, reaction product of ethylene glycol diglycidyl ether with (meth)acrylic acid, reaction product of diethylene glycol diglycidyl ether with (meth)acrylic acid, bis(acryloxyethyl) hydroxyethyl isocyanurate, bis (methacryloxyethyl) hydroxyethyl isocyanurate, reaction product of bisphenol A diglycidyl ether and (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth)acrylate, methoxytetraethylene glycol (meta)acrylate, methoxytriethylene glycol (meth)acrylate, methoxyethylene glycol (meth)acrylate, methoxyethyl (meth)acrylate, glycidyl (meth)acrylate, glycerol (meth)acrylate, ethylcarbitol (meth)acrylate, 2-ethoxyethyl (meth)acrylate, N,N-dimethylaminoethyl (meth)acrylate, 2-cyanoethyl (meth)acrylate, reaction product of butyl glycidyl ether with (meth)acrylic acid, butoxytriethylene glycol (meth)acrylate, butanediol mono(meth)acrylate, etc. These compounds may be used singly or in combinations of two or more.

(2) Epoxy-Based Resin

The epoxy-based resin contains an epoxy resin and a curing agent, and preferably contains an amine-based compound, an acid anhydride, and a metal catalyst as optional components. The epoxy resin is not particularly limited provided that it has two or more epoxy groups in the molecule, and includes, for example, a bisphenol A type epoxy resin, bisphenol F type epoxy resin, bisphenol S type epoxy resin, phenol novolac type epoxy resin, alicyclic epoxy resin, heterocyclic epoxy resin, glycidyl ester epoxy resin, glycidyl amine-based epoxy resin, brominated epoxy resin, hydrogenated bisphenol A type epoxy resin, aliphatic epoxy resins such as propylene glycol glycidyl ether or pentaerythritol polyglycidyl ether, urethane-modified epoxy resin, etc. Two or more type of these epoxy resins can be used in admixture. Moreover, monoepoxy compounds such as butyl glycidyl ether, phenyl glycidyl ether, cresyl glycidyl ether, and glycidyl ether of aliphatic alcohol can be compounded to reduce the viscosity, if necessary.

Further, a pressure-sensitive adhesive can be used as a material for forming an adhesive layer. The pressure-sensitive adhesive, such as rubber-based, acrylic-based, and silicone-based adhesives can be used, and acrylic-based pressure-sensitive adhesive is particularly desirable.

(3) Pressure-Sensitive Adhesive

Examples of the acrylic-based pressure-sensitive adhesive include pressure-sensitive adhesives using a (meth)acrylic-based polymer obtained by copolymerizing a (meth)acrylic acid alkyl ester or other (meth)acrylic-based monomer components.

The aforementioned (meth)acrylic acid alkyl ester includes, for example, ethyl (meth)acrylate, isopropyl (meth)acrylate, n-butyl (meth)acrylate, isobutyl (meth)acrylate, pentyl (meth)acrylate, 2-ethylhexyl (meth)acrylate, isooctyl (meth)acrylate, n-octyl (meth)acrylate, isononyl (meth)acrylate, decyl (meth)acrylate, lauryl (meth)acrylate, etc.

Other (meth)acrylic-based monomer components include, for example, carboxyl group-containing monomers such as acrylic acid, methacrylic acid, itaconic acid, crotonic acid, maleic acid, and fumaric acid; hydroxy group-containing monomers, such as 2-hydroxyethyl (meth)acrylate, 2-hydroxypropyl (meth)acrylate, 4-hydroxybutyl (meth)acrylate, polyoxypropylene (meth)acrylate, and caprolactone-modified (meth)acrylate; nitrogen-containing monomers such as N-vinylpyrrolidone, N-vinylcaprolactam, acroylmorpholin, (meth)acrylamide, dimethylaminoethyl (meth)acrylate, diethylaminoethyl (meth)acrylate, dimethylaminopropyl (meth)acrylate; and epoxy group-containing monomers such as glycidyl (meth)acrylate.

A solvent may be added to the coating solution of the adhesive for adjusting the viscosity and improving the coatability. Solvents include acetate esters such as ethyl acetate, butyl acetate, methyl acetate; alcohols such as methanol, ethanol, propanol, isopropanol, benzyl alcohol; ketones such as methyl ethyl ketone, acetone, cyclopentanone, cyclohexanone; basic solvents such as benzylamine, triethylamine, pyridine; and non-polar solvents such as cyclohexane, benzene, toluene, xylene, anisole, hexane, and heptane. These solvents can be added in any proportion, one type may be added alone, or a plurality of components may be blended. These solvents are dried and removed in the drying zone of the oven and film coater line.

3. Oriented Layer

The optical film according to the present embodiment may have an oriented layer between the light reflection layer in which the cholesteric liquid crystal phases laminated in the optical laminate is fixed and the polarizing element layer. The oriented layer has a function of more precisely defining the orientation direction of the liquid crystal compound in the cholesteric liquid crystal phase. The oriented layer can be arranged by means such as rubbing treatment of an organic compound (preferably a polymer), oblique vapor deposition of an inorganic compound, formation of a layer having microgrooves, etc. Furthermore, oriented layers which produce an orientation function by the application of an electric, magnetic field or light irradiation, have also been known. The oriented layer is preferably formed on the surface of the polymer film by rubbing treatment.

The oriented layer preferably has a certain degree of adhesion to the adjacent light reflection layer and polarizing element layer. For example, when an orientation layer is inserted into an optical laminate having three light reflection layers in which cholesteric liquid crystal layers are fixed, first, two laminates each having a light reflection layer and an oriented layer is prepared, and laminate [1] (light reflection layer [1]/oriented layer [1]) and laminate [2] (light reflection layer [2]/oriented layer [2]) are adhered together using an adhesive to produce laminate [A] having a layer structure of oriented layer [1]/light reflection layer [1]/adhesive/light reflection layer [2]/oriented layer [2]. Next, one of the oriented layers, oriented layer [2] is peeled off, and further laminate [3] (light reflection layer [3]/oriented layer [3]) having the light reflection layer and the oriented layer preliminarily prepared and laminate [A] produced as described above are similarly adhered together using an adhesive to produce laminate [13] having a laminated structure of oriented layer [1]/light reflection layer [1]/adhesive/light reflection layer [2]/adhesive/light reflection layer [3]/oriented layer [3]. Accordingly, the oriented layer is desirably inserted with a weak peeling force that allows peeling off at the interface between the light reflection layer in which the cholesteric liquid crystal phase is fixed and the oriented layer. Incidentally, the interface at which the oriented layer is peeled off is not particularly limited, but is preferably a light reflection layer and an oriented layer is preferably peeled off at an interface, in consideration of laminating laminate [3] in a separate step.

The material used as the oriented layer is preferably a polymer of an organic compound, and a polymer that can be crosslinked by itself or a polymer that is crosslinked with a crosslinking agent is typically used. Moreover, the polymer having both functions may be used. Examples of polymers include polymers, such as polymethylmethacrylate, an acrylic acid/methacrylic acid copolymer, styrene/maleinimide copolymer, polyvinyl alcohol and modified polyvinyl alcohol, poly(N-methylolacrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, gelatin, polyethylene, polypropylene, polycarbonate and compounds such as silane coupling agents. Examples of preferred polymers include water-soluble polymers such as poly(N-methylolacrylamide), carboxymethyl cellulose, gelatin, polyvinyl alcohol and modified polyvinyl alcohol, and further include gelatin, polyvinyl alcohol and modified polyvinyl alcohol. The thickness of the oriented layer is preferably 0.1 µm or more and 2.0 µm or less. When an oriented layer is arranged between the light reflection layer of the cholesteric liquid crystal phase and the polarizing element layer, an oriented layer having low birefringence is preferably used from the viewpoint of a degree of polarization, and triacetyl cellulose (TAC), polyolefin, acrylic and the like having low birefringence are preferred.

EXAMPLES

The present disclosure will be described in more detail below with reference to Examples, but the present disclosure is not limited to these Examples provided that the present disclosure does not deviate from its gist.

<Preparation of Coating Solution (Liquid Crystal Composition)>

A coating solution (R) having the composition shown in Table 1 below and a coating solution (L) having the composition shown in Table 2 below were prepared, respectively.

TABLE 1

Composition table of coating solution (R)

| Material | Material name (manufacturer) | Formulation amount (g) | | | | | | | | |
|---|---|---|---|---|---|---|---|---|---|---|
| | | R1 | R2 | R3 | R4 | R5 | R6 | R7 | R8 | R9 |
| Rod-shaped liquid crystal compound | LC-242 (BASF) | 10.00 | 10.00 | 10.00 | 10.00 | 10.00 | 10.00 | 10.00 | 10.00 | 10.00 |
| Chiral agent | LC-756 (BASF) | 0.79 | 0.65 | 0.62 | 0.60 | 0.58 | 0.47 | 0.43 | 0.40 | 0.37 |
| Polymerization initiator | Lucirin TPO (BASF) | 0.50 | 0.50 | 0.50 | 0.50 | 0.50 | 0.50 | 0.50 | 0.50 | 0.50 |
| Solvent | Cyclopentanone | 28.67 | 28.81 | 28.84 | 28.86 | 28.88 | 28.99 | 29.03 | 29.06 | 29.09 |

TABLE 2

Composition table of coating solution (L)

| Material | Material name (manufacturer) | Formulation amount (g) | | | | | | |
|---|---|---|---|---|---|---|---|---|
| | | L1 | L2 | L3 | L4 | L5 | L6 | L7 |
| Rod-shaped liquid crystal compound | LC-242 (BASF) | 10.00 | 10.00 | 10.00 | 10.00 | 10.00 | 10.00 | 10.00 |
| Chiral agent | Compound 1 | 2.16 | 1.78 | 1.56 | 1.45 | 1.37 | 1.32 | 1.12 |
| Polymerization initiator | Lucirin TPO (BASF) | 0.50 | 0.50 | 0.50 | 0.50 | 0.50 | 0.50 | 0.50 |
| Solvent | Cyclopentanone | 27.30 | 27.68 | 27.90 | 28.01 | 28.09 | 28.14 | 28.34 |

[Chemical Formula 1]

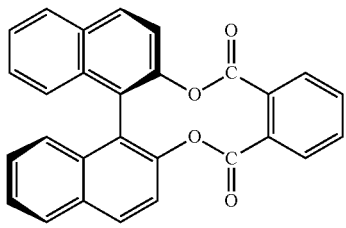

Chiral agent: Compound 1 (compound described in Japanese Patent Laid-Open No. 2002-179668)

<Preparation of Adhesive>

Adhesives with the compositions shown in Table 3 below were prepared.

TABLE 3

Composition Table of adhesive (S1)

| Material (type) | Material name | Formulation amount (g) |
|---|---|---|
| Adhesive | Acrylic-based adhesive SK-Dyne 906 (manufactured by Soken Chemical & Engineering Co., Ltd.) | 10.00 |
| Solvent | Methyl ethyl ketone | 5.00 |

<Preparation of Light Reflection Layer>

Using the prepared 16 types of coating solutions (R1 to R9) and (L1 to L7) each, a coating film (light reflection layer) of each cholesteric liquid crystal was produced by the procedure described below, and the center wavelength of selective reflection was evaluated. As the substrate of each light reflection layer, a PET film (manufactured by Toyobo Co., Ltd., "trade name A4100", thickness 50 μm) having no undercoat layer that had been subjected to rubbing treatment, was used.

(1) The surface of the PET film was coated with each coating solution at room temperature so as to have a predetermined thickness using a wire bar.

(2) The solvent was removed by heating at 150° C. for 3 minutes to obtain a cholesteric liquid crystal phase. Next, a high-pressure mercury lamp (HX4000L manufactured by Harison Toshiba Lighting Co., Ltd.) was irradiated with UV at 120 W output for 5 to 10 seconds to fix the cholesteric liquid crystal phase, to produce a cholesteric liquid crystal coating film (light reflection layer).

(3) Using a spectrophotometer ("MPC-3100" manufactured by Shimadzu Corporation), the reflection spectrum of the produced light reflection layer was measured, and the center wavelength of selective reflection and the maximum reflectance were determined. Table 4 below shows the thickness, center wavelength of selective reflection, and maximum reflectance of each light reflection layer used in each Example.

TABLE 4

| | Light reflection layer 1 | | | | Light reflection layer 2 | | | | Light reflection layer 3 | | | |
|---|---|---|---|---|---|---|---|---|---|---|---|---|
| | Coating solution for use | Thickness (μm) | Maximum reflectance (%) | Center wavelength of selective reflection (nm) | Coating solution for use | Thickness (μm) | Maximum reflectance (%) | Center wavelength of selective reflection (nm) | Coating solution for use | Thickness (μm) | Maximum reflectance (%) | Center wavelength of selective reflection (nm) |
| Example 1 | R1 | 0.5 | 20.4 | 440 | L3 | 0.5 | 18.3 | 590 | R7 | 0.5 | 20.1 | 780 |
| Example 2 | L2 | 0.5 | 16.2 | 530 | R6 | 0.5 | 15.8 | 720 | | | | |
| Example 3 | L2 | 0.7 | 26.4 | 538 | R1 | 0.7 | 27.4 | 446 | | | | |
| Example 4 | L5 | 0.9 | 23.5 | 654 | R3 | 0.5 | 19.0 | 545 | | | | |
| Example 5 | R2 | 0.7 | 22.0 | 524 | L5 | 0.9 | 23.5 | 654 | | | | |
| Example 6 | R5 | 0.7 | 20.2 | 589 | L5 | 0.9 | 23.5 | 654 | | | | |
| Example 7 | L5 | 0.9 | 23.5 | 654 | R1 | 0.7 | 27.4 | 446 | | | | |
| Example 8 | R1 | 0.7 | 27.4 | 446 | L5 | 1.2 | 38.0 | 667 | | | | |
| Example 9 | L6 | 0.9 | 22.6 | 665 | R1 | 0.7 | 27.4 | 446 | | | | |
| Example 10 | L2 | 0.5 | 17.6 | 536 | R1 | 1.2 | 42.7 | 451 | | | | |
| Example 11 | L2 | 0.5 | 17.6 | 536 | R1 | 0.9 | 32.7 | 448 | | | | |
| Example 12 | R1 | 0.5 | 20.4 | 440 | L7 | 0.5 | 19.9 | 780 | | | | |
| Example 13 | R8 | 1.2 | 27.9 | 825 | L1 | 0.9 | 32.1 | 448 | | | | |
| Example 14 | L1 | 0.9 | 32.1 | 448 | R9 | 1.2 | 24.7 | 888 | | | | |
| Example 15 | R1 | 0.5 | 20.4 | 440 | R5 | 0.5 | 18.6 | 590 | R7 | 0.5 | 20.1 | 780 |
| Example 16 | R3 | 0.7 | 28.9 | 547 | R1 | 0.7 | 27.4 | 446 | | | | |

TABLE 4-continued

| | Light reflection layer 1 | | | | Light reflection layer 2 | | | | Light reflection layer 3 | | | |
|---|---|---|---|---|---|---|---|---|---|---|---|---|
| | Coating solution for use | Thickness (μm) | Maximum reflectance (%) | Center wavelength of selective reflection (nm) | Coating solution for use | Thickness (μm) | Maximum reflectance (%) | Center wavelength of selective reflection (nm) | Coating solution for use | Thickness (μm) | Maximum reflectance (%) | Center wavelength of selective reflection (nm) |
| Example 17 | L5 | 0.9 | 23.5 | 654 | L2 | 0.5 | 17.6 | 536 | | | | |
| Comparative Example 1 | R2 | 0.7 | 22.0 | 524 | L2 | 0.7 | 26.4 | 538 | R3 | 0.7 | 28.9 | 547 |
| Comparative Example 2 | R4 | 1.5 | 43.4 | 571 | L4 | 1.5 | 44.0 | 634 | | | | |
| Comparative Example 3 | R2 | 2.0 | 47.2 | 541 | L3 | 1.5 | 43.0 | 613 | | | | |

<Preparation of Polarizing Element Layer>

Polyvinyl alcohol (trade name "Kuraray Vinylon #750" manufactured by Kuraray Co., Ltd.) was immersed in the solution containing chloranthin fast red (C. I. 28160) 0.25 g/L, chrysophenine (C. I. 24895) 0.18 g/L, solophenyl blue 4 GL (C. I. 34200) 1.0 g/L, and 10 g/L of sodium sulfate, stained at 35° C. for 3 minutes, and then stretched 4 times in the solution. Then, the obtained dyeing sheet was immersed in an aqueous solution containing 2.5 g/L of nickel acetate and 6.6 g/L of boric acid at 35° C. for 3 minutes. Further, the sheet was dried at room temperature for 3 minutes while maintaining the state of tension, and then heat-treated at 70° C. for 3 minutes to produce a polarizing element layer. As a result of measuring the degree of polarization of the polarizing element layer by the absolute polarization method using a spectrophotometer, the degree of polarization of the polarizing element layer was 99.5%.

<Preparation of Optical Film>

Example 1, Example 15, and Comparative Example 1

The surface for coating of the cholesteric liquid crystal of light reflection layer 1 shown in Table 4 was coated with the prepared adhesive (S1) so that the thickness of the film after drying was 10 μm using a wire bar. After removing the solvent by heating at 40° C. for 1 minute, the cholesteric liquid crystal coating surface of light reflection layer 1 coated with the adhesive, and the cholesteric liquid crystal coating surface of light reflection layer 2 described in Table 4 above are adhered to each other by using a hand roller, a high-pressure mercury lamp ("HX4000L" manufactured by Harison Toshiba Lighting Co., Ltd.) was irradiated with 120 W output for 5 to 10 seconds to cure the adhesive, and two layers of light reflection layer 1 and light reflection layer 2 were laminated. Subsequently, the PET film on light reflection layer 2 side was peeled off, and the surface for coating of the cholesteric liquid crystal of light reflection layer 2 on which the PET film had been peeled off, was coated with the adhesive (S1) so that the thickness of the film after drying the adhesive (S1) was 10 μm by using a wire bar, and the cholesteric liquid crystal coating film of light reflection layer 3 described in Table 4 above was laminated in the same manner as in the procedure of laminating the two light reflection layers. Next, the PET film on light reflection layer 1 side and the PET film on light reflection layer 3 side were peeled off, respectively, and an optical laminate in which light reflection layer 1, light reflection layer 2, and light reflection layer 3 were laminated (light reflection layer 1/light reflection layer 2/light reflection layer 3), was produced. Next, a polarizing element layer was adhered onto light reflection layer 1 by using a urethane resin-based adhesive to produce an optical film.

Examples 2 to 14, Examples 16 to 17, and Comparative Examples 2 and 3

An optical laminate in which two layers of light reflection layer 1 and light reflection layer 2 shown in Table 4 were laminated (light reflection layer 1/light reflection layer 2), was produced by the same procedure as in Example 1 described above.

[Spectroscopic Performance Evaluation]

Using a spectrophotometer ("MPC-3100" manufactured by Shimadzu Corporation), the reflectance spectra of the optical laminates produced in Examples 1 to 17 and Comparative Examples 1 to 3 were each measured, to obtain the average reflectance, minimum reflectance, and maximum reflectance in the wavelength region of 450 nm to 750 nm and the minimum reflectance and maximum reflectance in the wavelength region of 400 nm to 900 nm. The obtained results are shown in Table 5 below.

[Appearance Evaluation]

The tint of the optical films produced in Examples 1 to 17 and Comparative Examples 1 to 3 was confirmed in the front direction and when tilted by 60 degrees. The obtained results are shown in Table 5 below.

[Degree of Polarization Evaluation]

The optical films produced in Examples 1 to 17 and Comparative Examples 1 to 3 were each evaluated for their degree of polarization by an absolute polarization method using a spectrophotometer. The obtained results are shown in Table 5 below.

[Haze (Hz) Evaluation]

The optical films produced in Examples 1 to 17 and Comparative Examples 1 to 3 were each evaluated for haze using a haze meter manufactured by Nippon Denshoku Co., Ltd. The obtained results are shown in Table 5 below.

TABLE 5

| Example | Spiral structure R: Right-handed L: Left-handed | Interval of center wavelength of selective reflection in light reflection layers adjacent to each other (nm) | Average reflectance (A) 450 nm to 750 nm (%) | Minimum reflectance (B) 450 nm to 750 nm (%) | Minimum reflectance (B') 400 nm to 900 nm (%) | Maximum reflectance (C) 450 nm to 750 nm (%) | Maximum reflectance (C') 400 nm to 900 nm (%) | (A)-(B) (%) |
|---|---|---|---|---|---|---|---|---|
| Example 1 | R/L/R | 150\|190 | 18.7 | 16.1 | 13.9 | 23.4 | 23.7 | 2.6 |
| Example 2 | L/R | 190 | 15.9 | 14.4 | 10.4 | 17.0 | 17.0 | 1.5 |
| Example 3 | R/L | 93 | 19.2 | 10.3 | 8.1 | 31.0 | 31.0 | 8.9 |
| Example 4 | R/L | 109 | 21.5 | 12.9 | 8.6 | 28.3 | 28.3 | 8.6 |
| Example 5 | R/L | 130 | 22.5 | 14.0 | 8.7 | 28.8 | 28.8 | 8.5 |
| Example 6 | R/L | 65 | 23.1 | 12.2 | 9.5 | 34.5 | 34.5 | 10.9 |
| Example 7 | R/L | 208 | 20.2 | 12.5 | 8.1 | 27.5 | 28.9 | 7.7 |
| Example 8 | R/L | 221 | 22.4 | 9.0 | 8.0 | 34.7 | 34.7 | 13.4 |
| Example 9 | R/L | 220 | 18.9 | 12.8 | 7.8 | 27.6 | 28.4 | 6.1 |
| Example 10 | R/L | 85 | 18.4 | 9.3 | 7.9 | 45.7 | 45.7 | 9.1 |
| Example 11 | R/L | 88 | 17.4 | 8.8 | 8.8 | 35.6 | 35.6 | 8.6 |
| Example 12 | R/L | 340 | 13.8 | 9.0 | 9.0 | 19.8 | 19.9 | 4.8 |
| Example 13 | L/R | 377 | 14.1 | 9.0 | 9.0 | 28.9 | 30.5 | 5.1 |
| Example 14 | L/R | 440 | 13.0 | 8.9 | 8.9 | 28.2 | 29.6 | 4.1 |
| Example 15 | R/R/R | 150\|190 | 19.2 | 16.9 | 12.6 | 23.1 | 23.1 | 2.3 |
| Example 16 | R/R | 101 | 18.9 | 9.3 | 7.6 | 29.1 | 29.3 | 9.6 |
| Example 17 | L/L | 118 | 19.6 | 13.4 | 9.3 | 25.8 | 25.8 | 6.2 |
| Comparative Example 1 | R/L/R | 14\|9 | 24.9 | 9.9 | 8.4 | 44.9 | 44.9 | 15.0 |
| Comparative Example 2 | R/L | 63 | 30.9 | 9.5 | 8.4 | 67.4 | 67.4 | 21.4 |
| Comparative Example 3 | R/L | 72 | 30.2 | 10.8 | 8.6 | 57.0 | 57.0 | 19.4 |

| Example | (C)-(A) (%) | Tint of reflected light in front direction | Tint of reflected light in direction tilted from front direction by 60 degrees | Degree of polarization (%) | Haze value (%) |
|---|---|---|---|---|---|
| Example 1 | 4.7 | Colorless | Colorless | 98.0 | 0.3 |
| Example 2 | 1.1 | Colorless | Colorless | 96.7 | 0.2 |
| Example 3 | 11.8 | Cyan | Blue | 96.0 | 0.2 |
| Example 4 | 6.8 | Orange | Yellow-green | 96.1 | 0.1 |
| Example 5 | 6.3 | Yellow | Cyan | 94.9 | 0.1 |
| Example 6 | 11.4 | Orange | Green | 97.1 | 0.1 |
| Example 7 | 7.3 | Magenta | Yellow-green | 93.7 | 0.1 |
| Example 8 | 12.3 | Magenta | Yellow-green | 91.7 | 0.1 |
| Example 9 | 8.7 | Magenta | Yellow-green | 95.2 | 0.2 |
| Example 10 | 27.3 | Blue | Blue | 96.9 | 0.2 |
| Example 11 | 18.2 | Blue | Blue | 97.4 | 0.2 |
| Example 12 | 6.0 | Cyan | Magenta | 98.6 | 0.2 |
| Example 13 | 14.8 | Blue-purple | Red | 96.1 | 0.1 |
| Example 14 | 15.2 | Blue-purple | Light red | 94.8 | 0.1 |
| Example 15 | 3.9 | Colorless | Colorless | 92.5 | 0.2 |
| Example 16 | 10.2 | Emerald | Cyan | 90.8 | 0.2 |
| Example 17 | 6.2 | Orange | Yellow-green | 93.7 | 0.3 |
| Comparative Example 1 | 20.0 | Green | Blue | 91.2 | 0.5 |
| Comparative Example 2 | 36.5 | Orange | Green | 82.9 | 0.6 |
| Comparative Example 3 | 26.8 | Yellow | Cyan | 59.6 | 0.8 |

Figure 3:
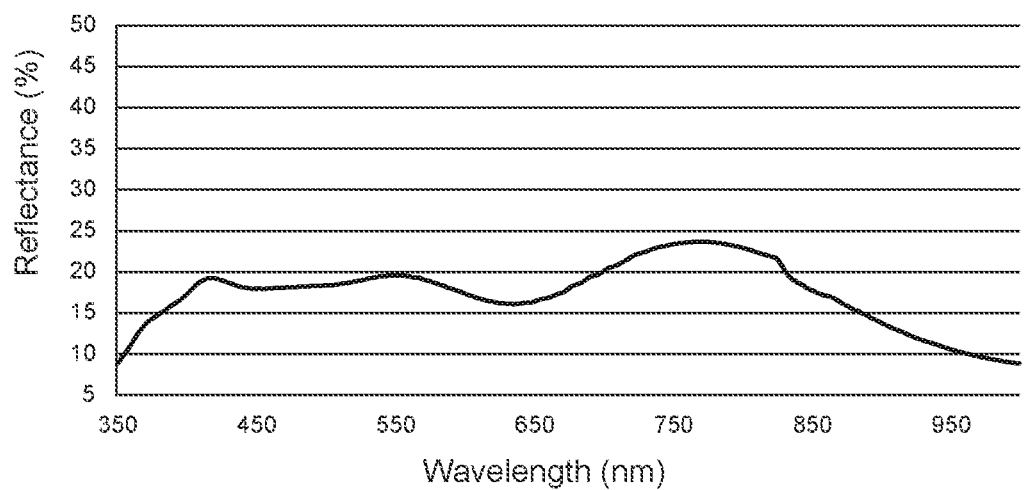
FIG. 3 is an illustration of the spectrum data of the optical laminate produced in Example 1.
Figure 4:
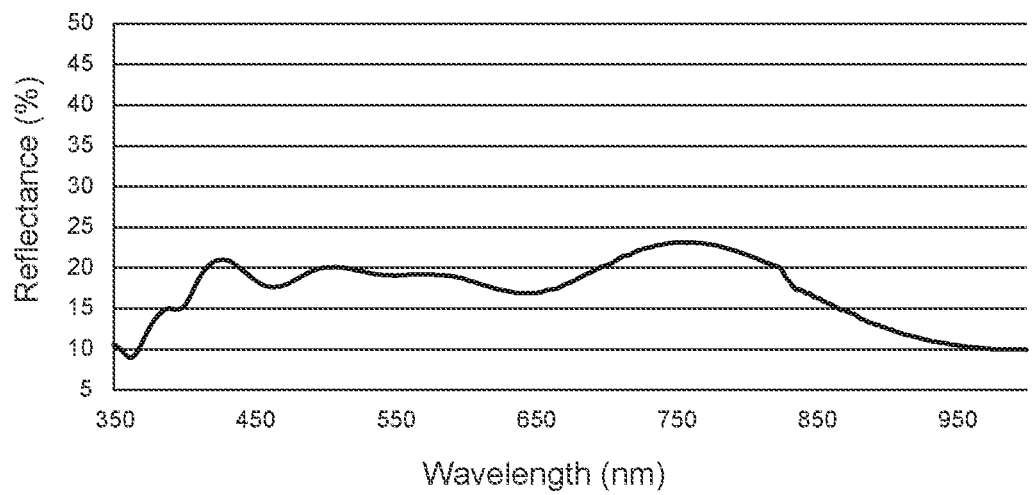
FIG. 4 is an illustration of the spectrum data of the optical laminate produced in Example 15.

As shown in Table 5 above, the optical film produced in Example 1, in which the light reflection layer in which the cholesteric liquid crystal phase having the right-handed spiral structure was fixed, the light reflection layer in which the cholesteric liquid crystal phase having the left-handed spiral structure was fixed, and the light reflection layer in which the cholesteric liquid crystal phase having the right-handed spiral structure was fixed were each laminated in this order, having the center wavelengths of selective reflection in the two adjacent light reflection layers are shifted by intervals of 150 nm and 190 nm, respectively, exhibited a high degree of polarization of 98.0% and the low haze value of 0.3%, respectively. Further, the optical film produced in Example 15 in which all the light reflection layers contained in the optical laminate were light reflection layers RPRLs, also exhibited a high degree of polarization of 92.5% and a low haze value of 0.2%, respectively. Further, as shown in Tables 4, and FIGS. 3 and 4, the optical films of Examples 1 and 15 each had three light reflection layers having the center wavelengths of selective reflection of 440 nm, 590 nm and 780 nm, respectively. Further, in the wavelength region of 450 nm or more and 750 nm or less, the difference between the maximum reflectance and the average reflectance of each optical laminate and the difference between the average reflectance and the minimum reflectance of each optical laminate were both 5% or less, and each produced optical film exhibited a colorless tint of the reflected light and a metallic color tone in the front direction and when tilted by 60 degrees.

Figure 5:
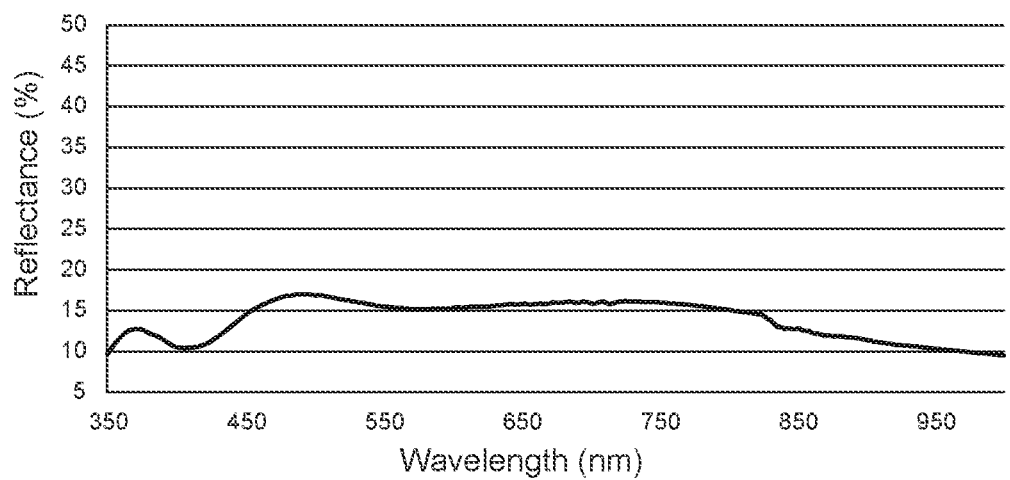
FIG. 5 is an illustration of the spectrum data of the optical laminate produced in Example 2.
Figure 6:
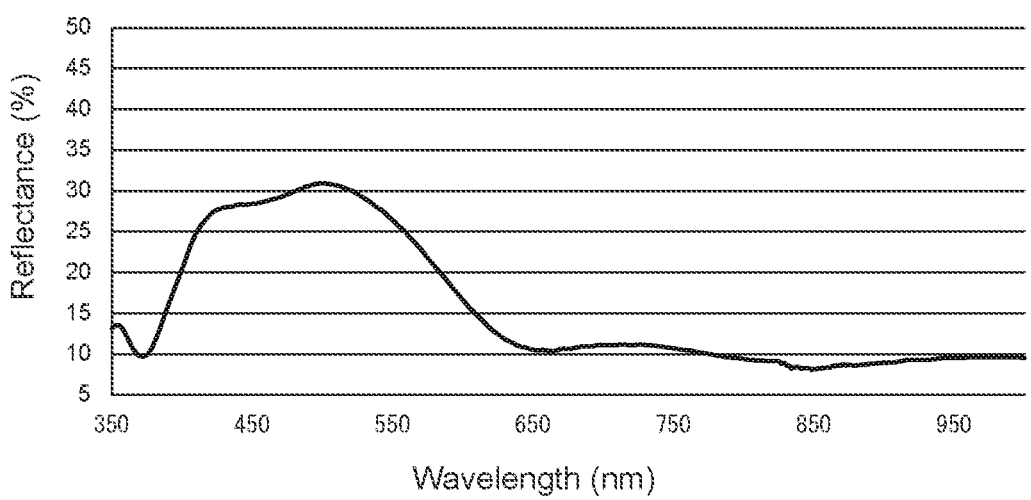
FIG. 6 is an illustration of the spectrum data of the optical laminate produced in Example 3.
Figure 7:
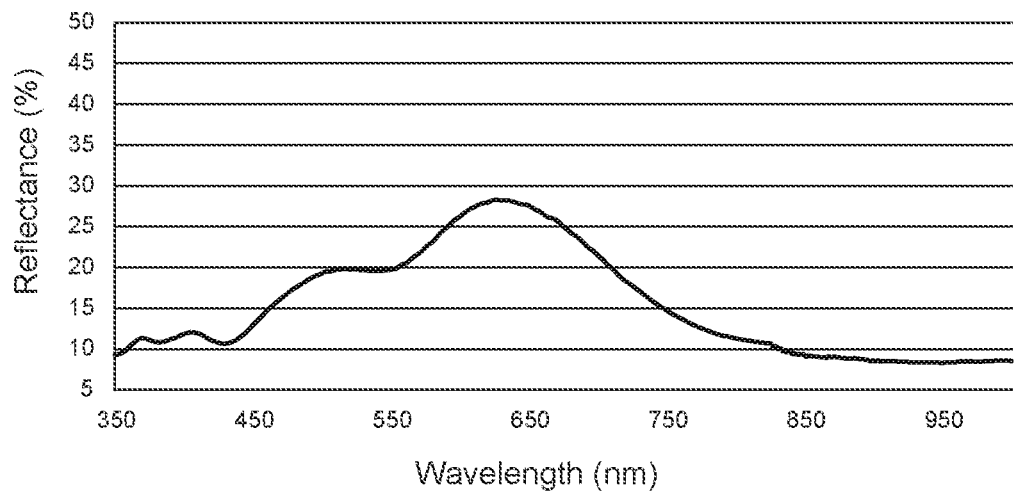
FIG. 7 is an illustration of the spectrum data of the optical laminate produced in Example 4.
Figure 8:
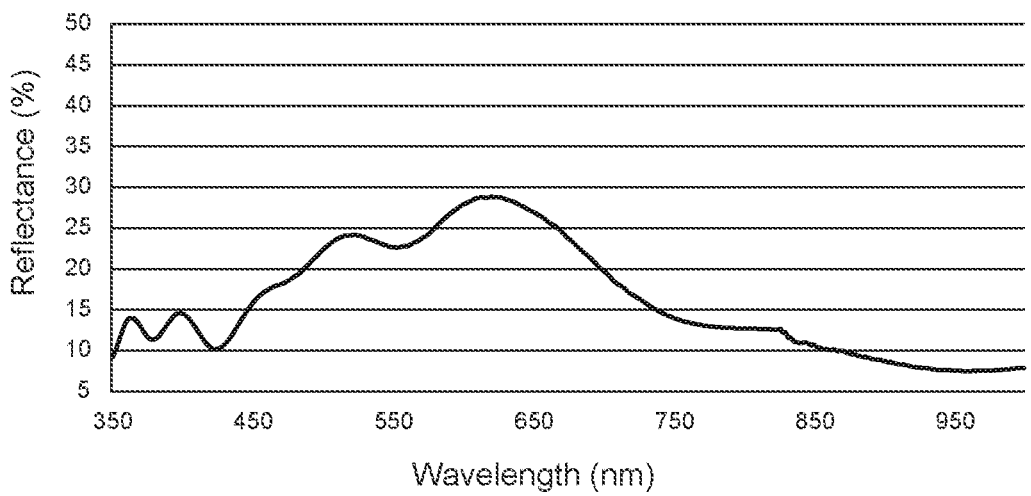
FIG. 8 is an illustration of the spectrum data of the optical laminate produced in Example 5.
Figure 9:
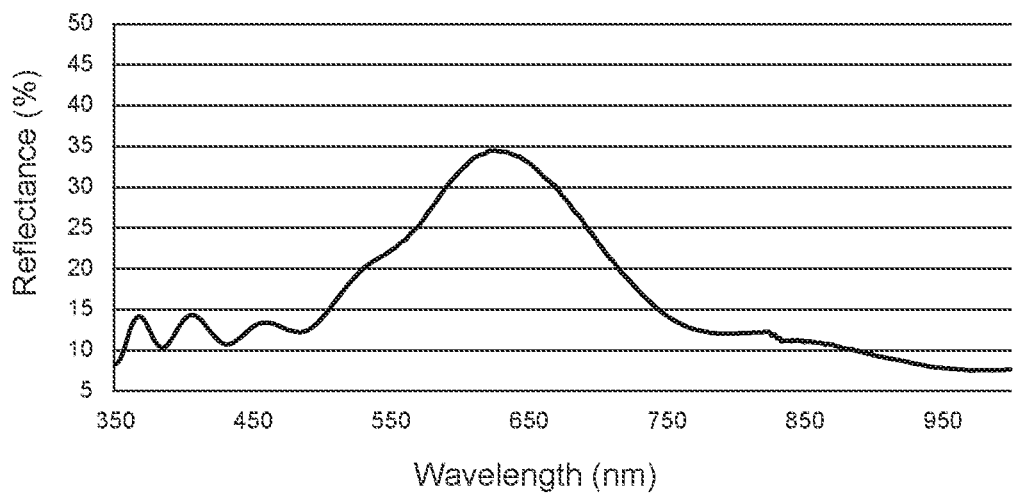
FIG. 9 is an illustration of the spectrum data of the optical laminate produced in Example 6.
Figure 10:
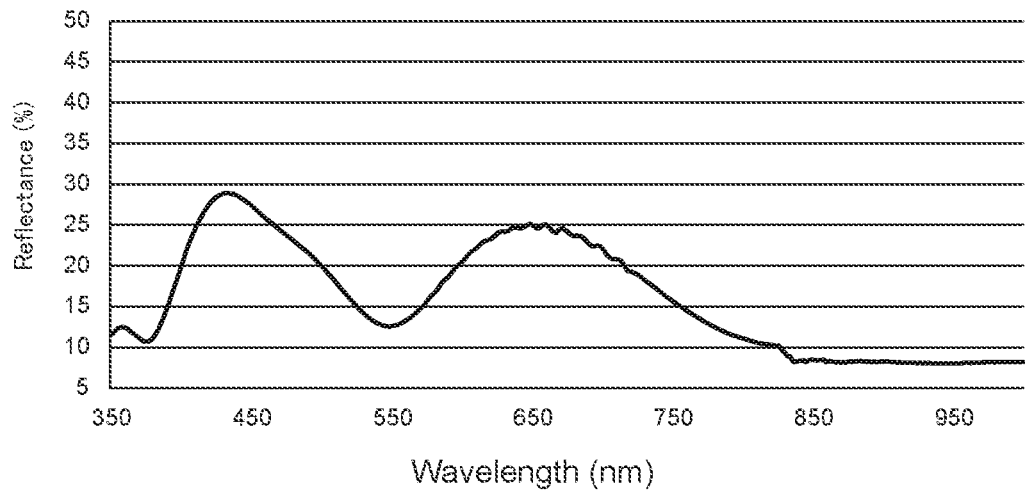
FIG. 10 is an illustration of the spectrum data of the optical laminate produced in Example 7.
Figure 11:
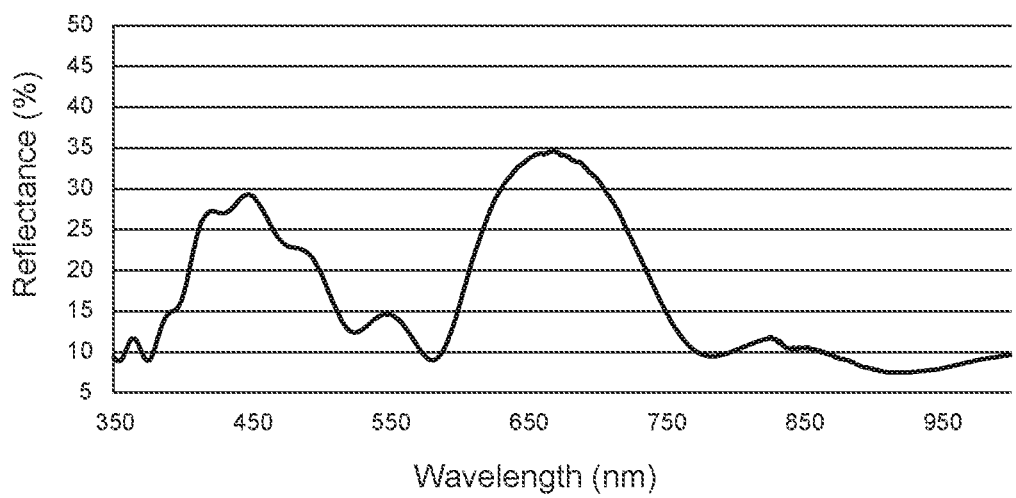
FIG. 11 is an illustration of the spectrum data of the optical laminate produced in Example 8.
Figure 12:
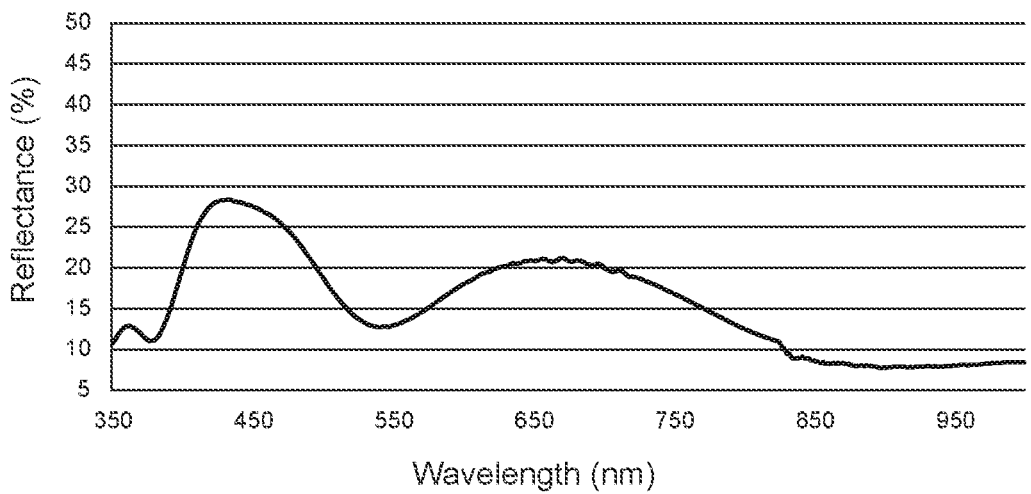
FIG. 12 is an illustration of the spectrum data of the optical laminate produced in Example 9.
Figure 13:
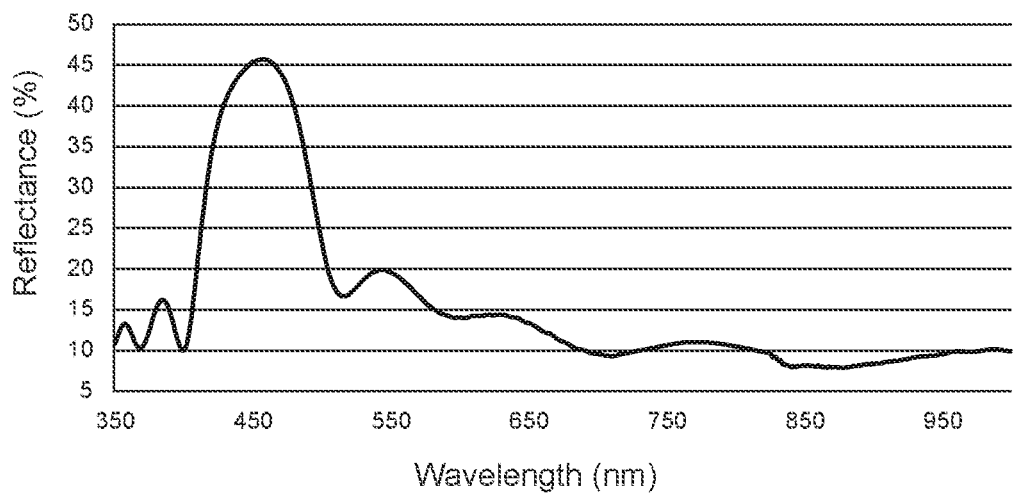
FIG. 13 is an illustration of the spectrum data of the optical laminate produced in Example 10.
Figure 14:
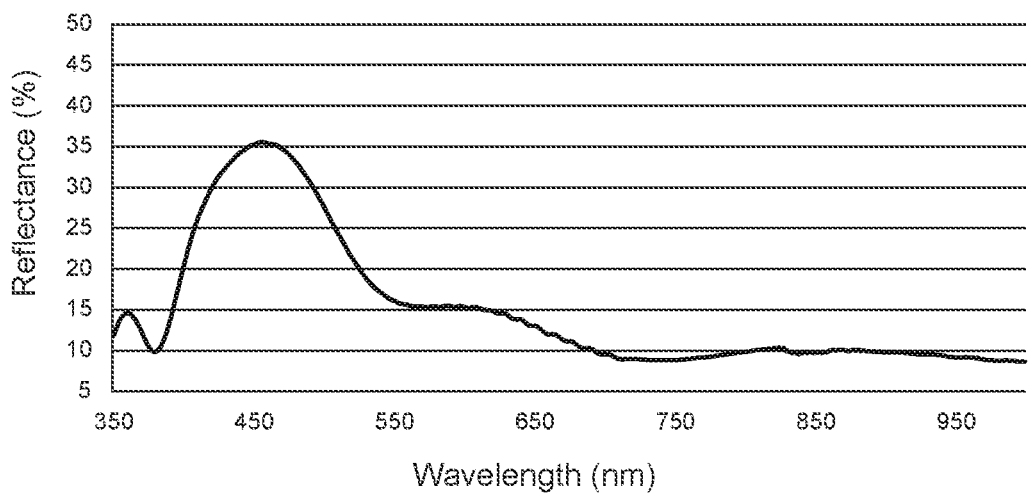
FIG. 14 is an illustration of the spectrum data of the optical laminate produced in Example 11.
Figure 15:
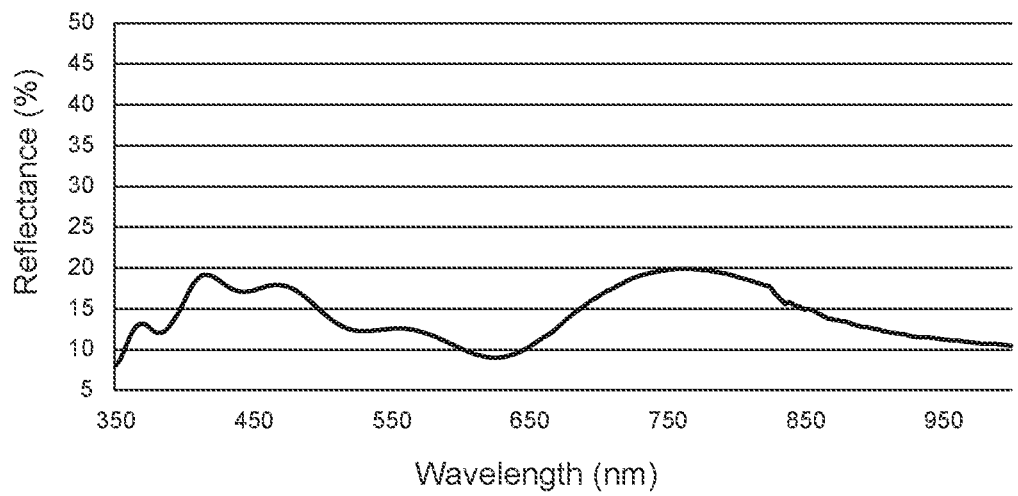
FIG. 15 is an illustration of the spectrum data of the optical laminate produced in Example 12.
Figure 16:
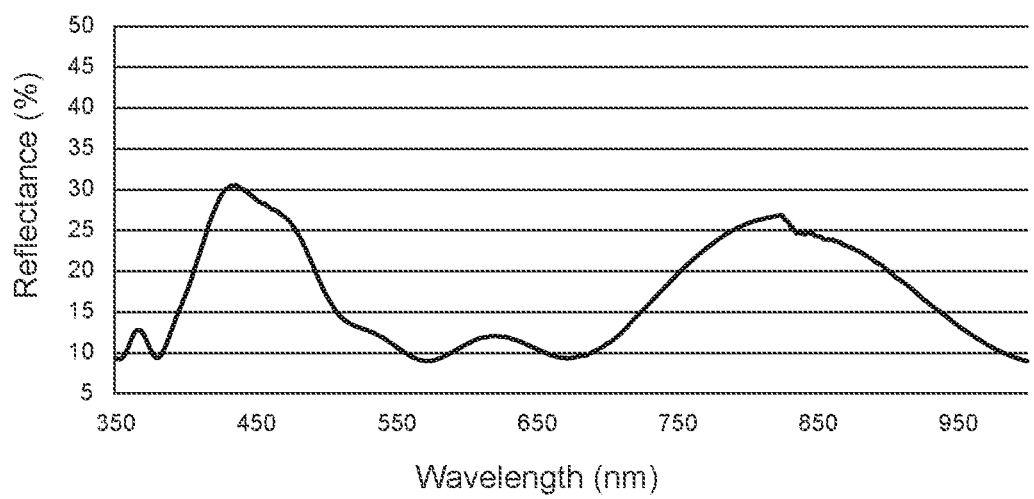
FIG. 16 is an illustration of the spectrum data of the optical laminate produced in Example 13.

The optical film produced in Example 2, in which the light reflection layer in which the cholesteric liquid crystal phase having a right-handed spiral structure was fixed and the light reflection layer in which the cholesteric liquid crystal phase having a left-handed spiral structure was fixed were laminated, having the center wavelengths of selective reflection in the two adjacent light reflection layers are shifted by intervals of 190 nm, exhibited a high degree of polarization of 96.7% and a low haze value of 0.2%, respectively. Further, as shown in Table 4 and FIG. 5, the optical film of Example 2 had two light reflection layers having the center wavelengths of selective reflection of 530 nm and 720 nm, respectively. Further, in the wavelength region of 450 nm or more and 750 nm or less, the difference between the maximum reflectance and the average reflectance of the optical laminate and the difference between the average reflectance and the minimum reflectance of the optical laminate were 5% or less, respectively. The produced optical film exhibited the colorless tint of the reflected light and a metallic color tone in the front direction and when tilted by 60 degrees.

The optical films of Examples 3 to 14 each, in which the light reflection layer in which the cholesteric liquid crystal phase having a right-handed spiral structure was fixed and the light reflection layer in which the cholesteric liquid crystal phase having a left-handed spiral structure was fixed, were laminated, and the center wavelengths of selective reflection in the two adjacent light reflection layers are shifted by a maximum of 440 nm and a minimum interval of 65 nm as shown in Table 5, having the center wavelengths of selective reflection, the interval of which was shifted by a maximum of 440 nm and a minimum interval of 65 nm in the two reflection layer adjacent to each other, as shown in Table 5, exhibited a high degree of polarization of 90% or more and a low haze value of 0.2% or less for any film. Further, as shown in FIGS. 6 to 17, the optical films of Examples 3 to 14 each contains a plurality of light reflection layers having the center wavelengths of selective reflection different from each other, and exhibited a tint of reflected color such as a magenta color, that could not be reproduced by a single center wavelength of selective reflection.

Figure 17:
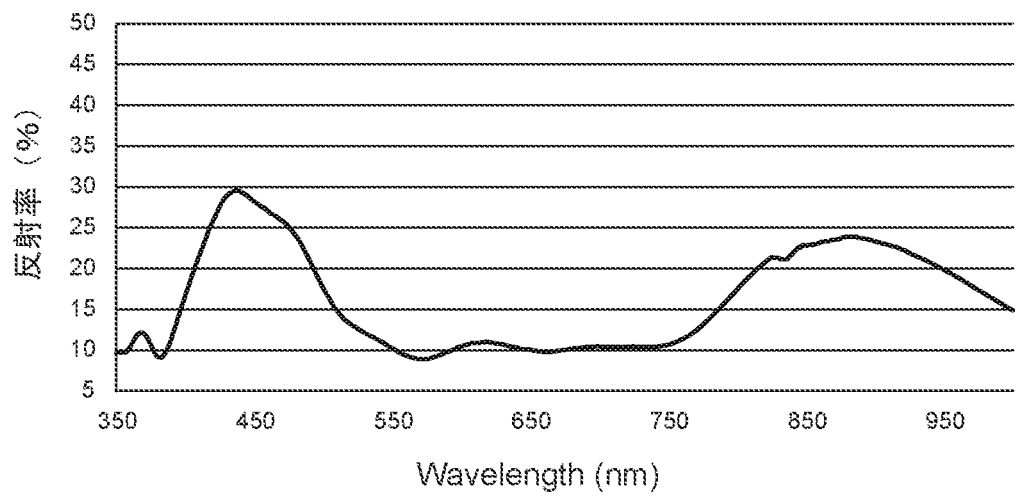
FIG. 17 is an illustration of the spectrum data of the optical laminate produced in Example 14.

Incidentally, as shown in FIG. 17, the optical film of Example 14 contains the light reflection layer having the center wavelength of reflection of 850 nm or more, and therefore was confirmed to exhibit a very light tint of reflected light when tilted by 60 degrees.

Figure 18:
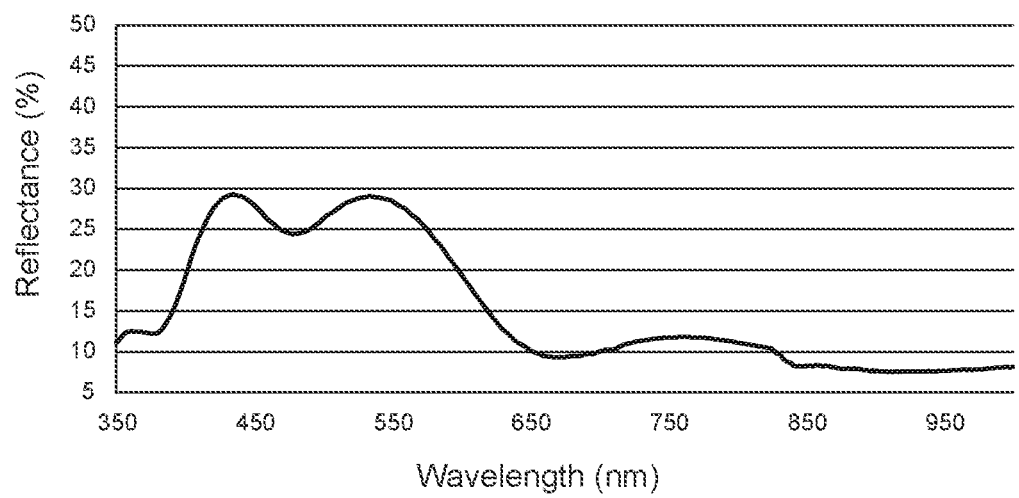
FIG. 18 is an illustration of the spectrum data of the optical laminate produced in Example 16.
Figure 19:
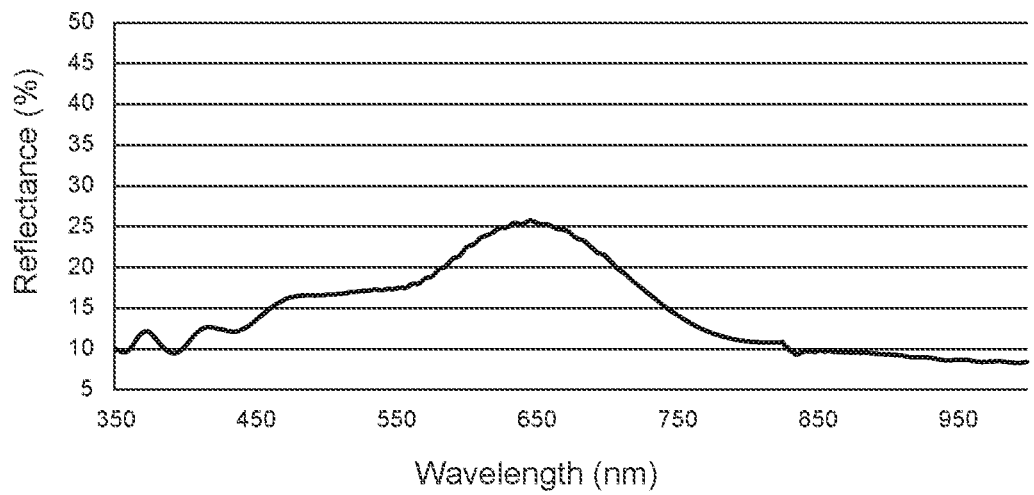
FIG. 19 is an illustration of the spectrum data of the optical laminate produced in Example 17.
Figure 20:
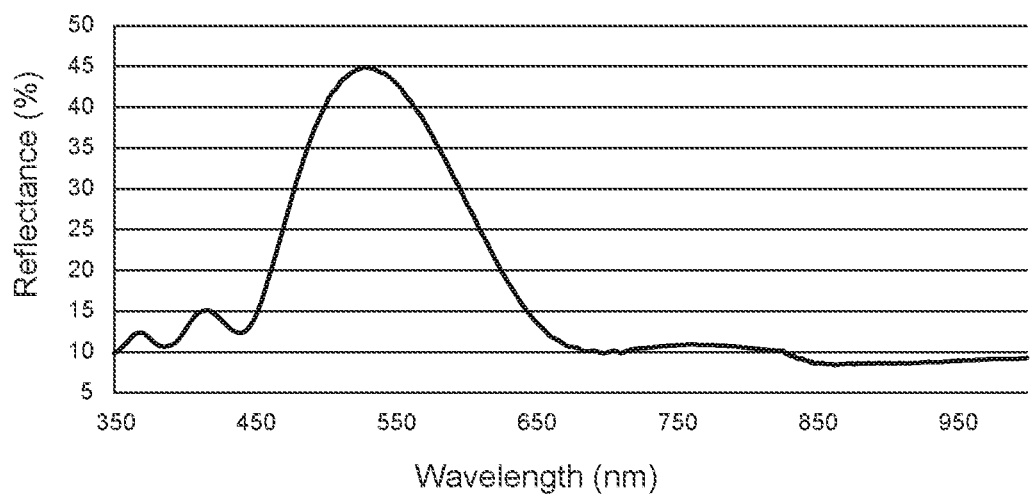
FIG. 20 is an illustration of the spectrum data of the optical laminate produced in Comparative Example 1.

As shown in FIGS. 18 and 19, the optical films of Examples 16 and 17 have the same spectra as the optical films of Examples 3 and 4. In Examples 16 and 17, since the light reflection layers having the same spiral structures were laminated, each example exhibited the degree of polarization that was slightly lower than the degree of polarization of Examples 3 and 4, however, exhibited a high degree of polarization of 90% or more and a low haze value of 0.3% or less, respectively.

The optical film of Comparative Example 1 having the intervals of the center wavelengths of selective reflection that are shifted by 14 nm and 9 nm, respectively in the corresponding two reflection layers adjacent to each other, has relatively similar spectra to that for a single center wavelength of selective reflection. Although the degree of polarization was 90% or more, the haze value was 0.5%, which was inferior to the haze values of other Examples.

Figure 21:
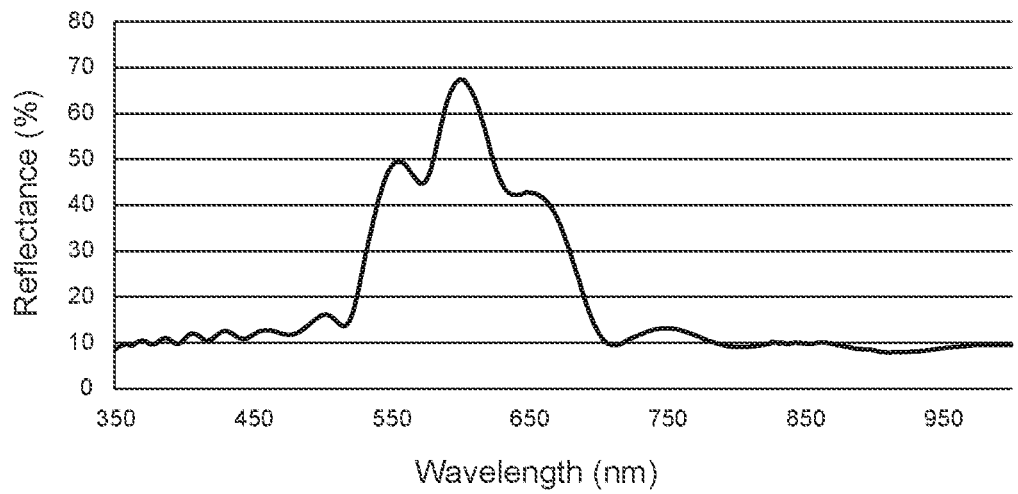
FIG. 21 is an illustration of the spectrum data of the optical laminate produced in Comparative Example 2.
Figure 22:
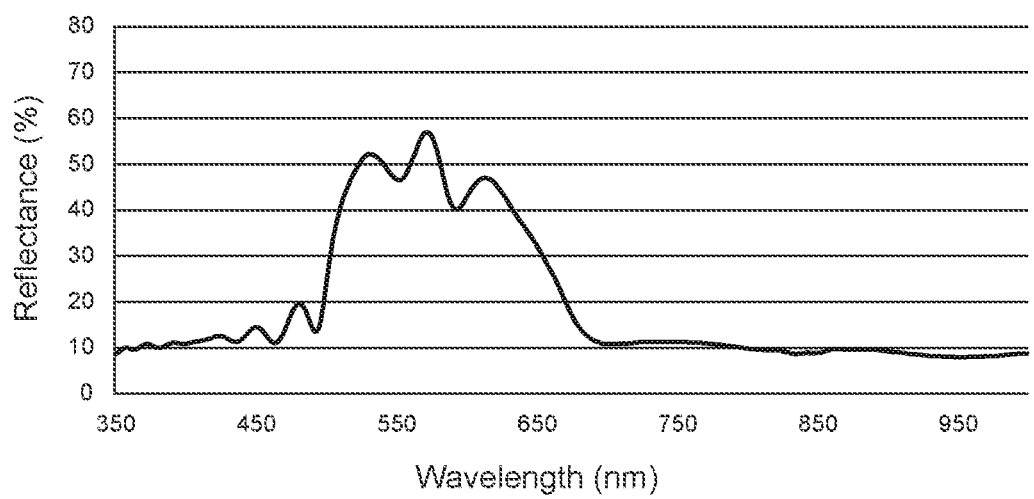
FIG. 22 is an illustration of the spectrum data of the optical laminate produced in Comparative Example 3.

As shown in Table 5, and FIGS. 21 and 22, the optical films of Comparative Examples 2 and 3 each have a maximum reflectance of 50% or more, so that the degree of polarization was low and the high haze value was 0.6%.

As described above, since each of the optical laminates of Examples 1 to 17 exhibits a degree of polarization of 90% or more and a low haze value of less than 0.5%, each of the optical laminates produced in Examples 1 to 17 is suitable for use in optical members. In particular, each of the optical films produced in Examples 1, 2 and 15 exhibiting the colorless tint of reflected light, is suitable for eyewear that requires colorless or silver-colored reflected light. Further, the optical films produced in Examples 3 to 14, 16 and 17 are suitable for eyewear that requires a reflective color that cannot be achieved by a single center wavelength of selective reflection.

The present disclosure relates to an optical film including a plurality of light reflection layers having center wavelengths of selective reflection different from each other, and having a high degree of polarization and a low haze value. Such optical films are mainly suitable for application of eyewear (sunglasses, goggles, helmet visors, etc.).

What is claimed is:
1. An optical film comprising:
an optical laminate in which two or more light reflection layers having center wavelengths of reflection different from each other are laminated; and
a polarizing element layer, wherein
the two or more light reflection layers are selected from
at least one light reflection layer RPRL having a center wavelength of selective reflection in a range of 400 nm or more and 900 nm or less, in which a cholesteric liquid crystal phase with a right-handed spiral structure having a right-handed circularly polarized light reflectivity is fixed, and
at least one light reflection layer LPRL having a center wavelength of selective reflection in a range of 400 nm or more and 900 nm or less, in which a cholesteric liquid crystal phase with a left-handed spiral structure having a left-handed circularly polarized light reflectivity is fixed,
the light reflection layer RPRL and the light reflection layer LPRL each have a center wavelength of selective reflection shifted from that of a light reflection layer adjacent to each other by an interval of 40 nm or more and 500 nm or less,
the maximum reflectance of the optical laminate is 50% or less, and
a difference between a maximum reflectance and an average reflectance of the optical laminate is 30% or less and a difference between an average reflectance and a minimum reflectance of the optical laminate is 15% or less in a wavelength region of 450 nm or more and 750 nm or less.

2. The optical film according to claim 1, wherein the two or more light reflection layers comprise both of the light reflection layer RPRL and the light reflection layer LPRL.

3. The optical film according to claim 1, wherein a degree of polarization is 90% or more.

4. The optical film according to claim 1, wherein a degree of polarization is 95% or more.

5. The optical film according to claim 1, wherein a haze value (Hz) is less than 0.5%.

6. Eyewear comprising the optical film according to claim 1.

* * * * *